US012082111B2

(12) United States Patent
Horn et al.

(10) Patent No.: US 12,082,111 B2
(45) Date of Patent: Sep. 3, 2024

(54) BASE STATION REPORT OF USER EQUIPMENT ANTENNA SELECTION

(71) Applicant: QUALCOMM Incorporated, San Diego, CA (US)

(72) Inventors: Idan Michael Horn, Hod Hasharon (IL); Shay Landis, Hod Hasharon (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 379 days.

(21) Appl. No.: 17/496,413

(22) Filed: Oct. 7, 2021

(65) Prior Publication Data

US 2022/0116872 A1    Apr. 14, 2022

Related U.S. Application Data

(60) Provisional application No. 63/090,153, filed on Oct. 9, 2020.

(51) Int. Cl.
*H04B 7/06* (2006.01)
*H04L 5/00* (2006.01)
*H04W 52/02* (2009.01)

(52) U.S. Cl.
CPC ...... *H04W 52/0225* (2013.01); *H04B 7/0608* (2013.01); *H04L 5/0048* (2013.01)

(58) Field of Classification Search
CPC ............. H04W 52/0225; H04B 7/0608; H04B 7/0802; H04B 7/0874; H04L 5/0048
See application file for complete search history.

(56) References Cited

U.S. PATENT DOCUMENTS

| 2011/0243079 | A1* | 10/2011 | Chen | H04B 7/0639 370/329 |
| 2020/0083939 | A1* | 3/2020 | Park | H04L 5/0051 |
| 2020/0112355 | A1* | 4/2020 | Park | H04L 5/0094 |
| 2020/0169995 | A1 | 5/2020 | Nam et al. | |

(Continued)

OTHER PUBLICATIONS

Intel Corporation: "On Codebook Based UL Transmission", 3GPP Draft, 3GPP TSG RAN WG1 Meeting #90, R1-1712537, Aug. 20, 2017, XP051315353, 6 pages (Year: 2017).*

(Continued)

*Primary Examiner* — Kent Krueger
(74) *Attorney, Agent, or Firm* — Holland & Hart LLP

(57) ABSTRACT

Methods, systems, and devices for wireless communications are described. A first wireless device may transmit, to a second wireless device, a first indication of a capability to selectively configure activation states for a set of antenna elements of an antenna array of the first wireless device, and of parameter values that indicate a structure of the antenna array. The first wireless device may then receive, from the second wireless device in response to the transmitted first indication, a second indication for the first wireless device to modify an activation state of one or more antenna elements of the set of antenna elements. The first wireless device may subsequently identify the activation state of the one or more antenna elements based on the received second indication, and communicate with the second wireless device using the antenna array according to the identified activation state of the one or more antenna elements.

30 Claims, 11 Drawing Sheets

(56) References Cited

U.S. PATENT DOCUMENTS

| | | | |
|---|---|---|---|
| 2021/0176094 A1* | 6/2021 | Kang | H04L 5/0094 |
| 2021/0242919 A1* | 8/2021 | Park | H04B 7/0491 |
| 2022/0353039 A1* | 11/2022 | Okamura | H04W 52/146 |
| 2023/0139710 A1* | 5/2023 | Okamura | H04W 52/28 |
| | | | 455/522 |

OTHER PUBLICATIONS

International Search Report and Written Opinion—PCT/US2021/054154ISA/EPO—Feb. 24, 2022.

\* cited by examiner

BASE STATION REPORT OF USER EQUIPMENT ANTENNA SELECTION

CROSS REFERENCE

The present Application for Patent claims the benefit of U.S. Provisional Patent Application No. 63/090,153 by HORN et al., entitled "BASE STATION REPORT OF USER EQUIPMENT ANTENNA SELECTION," filed Oct. 9, 2020, assigned to the assignee hereof, and expressly incorporated by reference herein.

FIELD OF TECHNOLOGY

The following relates to wireless communications, including base station reports of user equipment (UE) antenna selection.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

As the frequency of wireless communications increases, the wavelength of the signals decreases, which results in antenna elements for wireless devices becoming smaller and spaced closer together. Smaller antenna elements may enable higher quantities of antenna elements to be disposed within an antenna array, thereby allowing for beamforming and improved beam spatial separation. However, increasing quantities of antenna elements within an antenna array may correspond to a linear increase of power consumption of the antenna array, which may reduce battery life and overall user experience.

SUMMARY

The described techniques relate to improved methods, systems, devices, and apparatuses that support base station reports of user equipment (UE) antenna selection. Generally, the described techniques provide for signaling between wireless devices (e.g., UEs and base stations) which enable a second wireless device (e.g., base station) to modify activation states of antenna elements of a first wireless device (e.g., UEs). For example, a UE may indicate, to a base station, that it is capable of configuring (e.g., modifying, adjusting) activation states of antenna elements within an antenna array. The UE may also report parameters associated with the structure of the antenna array, such as an arrangement of antenna elements, size of antenna array, quantity of antenna elements, or any combination thereof. The base station may subsequently instruct the UE to modify an activation state of one or more antenna elements using the determined parameters of the antenna array. In some cases, the base station may additionally determine one or more characteristics of the network and may and instruct the UE to modify the activation state of the antenna elements based on both the determined parameters of the antenna array and the determined characteristics of the network. Network characteristics which may be used to selectively modify the antenna elements may include positions of UEs within the network, uplink/downlink configurations for the UEs within the network, or both. The techniques described herein may enable wireless devices (e.g., base stations, integrated access and backhaul (IAB) nodes) to selectively modify activation states of antenna elements of other wireless devices (e.g., UEs, IAB nodes) based on the structure of antenna elements and network characteristics, which may thereby provide for reduced power consumption of the antenna arrays and reduced interference as compared to other techniques.

A method of wireless communication at a first wireless device is described. The method may include transmitting, to a second wireless device, a first indication of a capability to selectively configure activation states for a set of antenna elements of an antenna array of the first wireless device, and of one or more parameter values that indicate a structure of the antenna array associated with one or more characteristics of beams formable by the antenna array, receiving, from the second wireless device in response to the transmitted first indication, a second indication for the first wireless device to modify an activation state of one or more antenna elements of the set of antenna elements, identifying the activation state of the one or more antenna elements based on the received second indication, and communicating with the second wireless device using the antenna array according to the identified activation state of the one or more antenna elements.

An apparatus for wireless communication at a first wireless device is described. The apparatus may include a processor, memory coupled with the processor, and instructions stored in the memory. The instructions may be executable by the processor to cause the apparatus to transmit, to a second wireless device, a first indication of a capability to selectively configure activation states for a set of antenna elements of an antenna array of the first wireless device, and of one or more parameter values that indicate a structure of the antenna array associated with one or more characteristics of beams formable by the antenna array, receive, from the second wireless device in response to the transmitted first indication, a second indication for the first wireless device to modify an activation state of one or more antenna elements of the set of antenna elements, identify the activation state of the one or more antenna elements based on the received second indication, and communicate with the second wireless device using the antenna array according to the identified activation state of the one or more antenna elements.

Another apparatus for wireless communication at a first wireless device is described. The apparatus may include means for transmitting, to a second wireless device, a first indication of a capability to selectively configure activation states for a set of antenna elements of an antenna array of the first wireless device, and of one or more parameter values that indicate a structure of the antenna array associated with one or more characteristics of beams formable by the antenna array, receiving, from the second wireless device in response to the transmitted first indication, a second indication for the first wireless device to modify an activation state of one or more antenna elements of the set of antenna elements, identifying the activation state of the one or more antenna elements based on the received second indication, and communicating with the second wireless device using the antenna array according to the identified activation state of the one or more antenna elements.

A non-transitory computer-readable medium storing code for wireless communication at a first wireless device is described. The code may include instructions executable by a processor to transmit, to a second wireless device, a first indication of a capability to selectively configure activation states for a set of antenna elements of an antenna array of the first wireless device, and of one or more parameter values that indicate a structure of the antenna array associated with one or more characteristics of beams formable by the antenna array, receive, from the second wireless device in response to the transmitted first indication, a second indication for the first wireless device to modify an activation state of one or more antenna elements of the set of antenna elements, identify the activation state of the one or more antenna elements based on the received second indication, and communicate with the second wireless device using the antenna array according to the identified activation state of the one or more antenna elements.

Some examples of the method, apparatuses, and non-transitory computer-readable medium described herein may further include operations, features, means, or instructions for transmitting, to the second wireless device, a request for the second wireless device to configure the activation state of the one or more antenna elements, where the second indication may be received based on transmitting the request.

In some examples of the method, apparatuses, and non-transitory computer-readable medium described herein, the request indicates a quantity of antenna elements associated with the request, that the request may be associated with the one or more antenna elements, or both.

In some examples of the method, apparatuses, and non-transitory computer-readable medium described herein, transmitting the first indication of the one or more parameter values that indicate the structure of the antenna array may include operations, features, means, or instructions for transmitting a first parameter value indicating an arrangement of antenna elements within the antenna array, a second parameter value indicating a quantity of antenna elements within the antenna array, or both, where receiving the second indication is based at least in part on the first parameter value, the second parameter value, or both.

In some examples of the method, apparatuses, and non-transitory computer-readable medium described herein, transmitting the first indication of the one or more parameter values that indicate the structure of the antenna array may include operations, features, means, or instructions for transmitting a first parameter value associated with supported phases or amplitudes of one or more phase shifters of the antenna array, a second parameter value indicating a size of the antenna array, a third parameter value indicating one or more distances between antenna elements of the antenna array, or any combination thereof, where receiving the second indication may be based on first parameter value, the second parameter value, the third parameter value, or any combination thereof.

In some examples of the method, apparatuses, and non-transitory computer-readable medium described herein, the first parameter value indicating the arrangement of antenna elements within the antenna array includes an indication of a unified linear array (ULA), a unified rectangular array (URA), a unified circular array (UCA), or any combination thereof.

Some examples of the method, apparatuses, and non-transitory computer-readable medium described herein may further include operations, features, means, or instructions for transmitting, to the second wireless device, an indication that an activation state of a subset of antenna elements of the set of antenna elements may be incapable of being modified, where receiving the second indication may be based on transmitting the indication that the activation state of the subset of antenna elements may be incapable of being modified.

In some examples of the method, apparatuses, and non-transitory computer-readable medium described herein, receiving the second indication to modify the activation state of the one or more antenna elements may include operations, features, means, or instructions for receiving an indication to modify a low noise amplifier (LNA) metric associated with the one or more antenna elements, a phase shifter metric associated with the one or more antenna elements, a power level metric associated with the one or more antenna elements, or any combination thereof.

In some examples of the method, apparatuses, and non-transitory computer-readable medium described herein, receiving the second indication to modify the activation state of the one or more antenna elements may include operations, features, means, or instructions for receiving an indication to deactivate the one or more antenna elements.

In some examples of the method, apparatuses, and non-transitory computer-readable medium described herein, the first indication may be transmitted via a radio resource control (RRC) message, a media access control-control element (MAC-CE) message, an uplink control information (UCI) message, a channel state information (CSI) report message, or any combination thereof.

In some examples of the method, apparatuses, and non-transitory computer-readable medium described herein, the second indication may be received via an RRC message, a MAC-CE, a downlink control information (DCI) message, a feedback message responsive to a CSI report message, or any combination thereof.

Some examples of the method, apparatuses, and non-transitory computer-readable medium described herein may further include operations, features, means, or instructions for identifying a second activation state for the set of antenna elements of the antenna array, the second activation state configured for performing transmissions, transmitting a reference signal to the second wireless device according to the second activation state, and receiving, from the second wireless device based on transmitting the reference signal, a third indication to modify the second activation state, to use the second activation state to perform transmissions, or both.

Some examples of the method, apparatuses, and non-transitory computer-readable medium described herein may further include operations, features, means, or instructions for transmitting a signal to the second wireless device in accordance with the third indication to modify the second activation state, to use the second activation state to perform transmissions, or both.

Some examples of the method, apparatuses, and non-transitory computer-readable medium described herein may further include operations, features, means, or instructions for receiving, from the second wireless device, an indication of the second activation state configured for performing transmissions, where transmitting the reference signal according to the second activation state may be based on receiving the indication of the second activation state.

Some examples of the method, apparatuses, and non-transitory computer-readable medium described herein may further include operations, features, means, or instructions for identifying signals transmitted by a third wireless device, and transmitting, to the second wireless device, a report including an indication of the signals transmitted by the third wireless device, where receiving the second indication to modify the activation state of the one or more antenna elements of the set of antenna elements of the antenna array may be based on transmitting the report.

In some examples of the method, apparatuses, and non-transitory computer-readable medium described herein, the first wireless device includes a UE, a first IAB node, or both, and where the second wireless device includes a base station, a second IAB node, or both.

In some examples of the method, apparatuses, and non-transitory computer-readable medium described herein, the one or more characteristics of beams formable by the antenna array include an orientation of primary beams, an orientation of unintended grating lobes, a size or shape of primary beams, a size or shape of unintended lobes, or any combination thereof.

A method of wireless communication at a second wireless device is described. The method may include receiving, from a first wireless device, a first indication of a capability to selectively configure activation states for a set of antenna elements of an antenna array of the first wireless device, and of one or more parameter values that indicate a structure of the antenna array and transmitting, to the first wireless device in response to the received first indication, a second indication for the first wireless device to modify an activation state of one or more antenna elements of the set of antenna elements of the antenna array.

An apparatus for wireless communication at a second wireless device is described. The apparatus may include a processor, memory coupled with the processor, and instructions stored in the memory. The instructions may be executable by the processor to cause the apparatus to receive, from a first wireless device, a first indication of a capability to selectively configure activation states for a set of antenna elements of an antenna array of the first wireless device, and of one or more parameter values that indicate a structure of the antenna array and transmit, to the first wireless device in response to the received first indication, a second indication for the first wireless device to modify an activation state of one or more antenna elements of the set of antenna elements of the antenna array.

Another apparatus for wireless communication at a second wireless device is described. The apparatus may include means for receiving, from a first wireless device, a first indication of a capability to selectively configure activation states for a set of antenna elements of an antenna array of the first wireless device, and of one or more parameter values that indicate a structure of the antenna array and transmitting, to the first wireless device in response to the received first indication, a second indication for the first wireless device to modify an activation state of one or more antenna elements of the set of antenna elements of the antenna array.

A non-transitory computer-readable medium storing code for wireless communication at a second wireless device is described. The code may include instructions executable by a processor to receive, from a first wireless device, a first indication of a capability to selectively configure activation states for a set of antenna elements of an antenna array of the first wireless device, and of one or more parameter values that indicate a structure of the antenna array and transmit, to the first wireless device in response to the received first indication, a second indication for the first wireless device to modify an activation state of one or more antenna elements of the set of antenna elements of the antenna array.

Some examples of the method, apparatuses, and non-transitory computer-readable medium described herein may further include operations, features, means, or instructions for determining a position of the first wireless device, a position of a third wireless device, or both, where transmitting the second indication may be based on the determined position of the first wireless device, the determined position of the third wireless device, or both.

Some examples of the method, apparatuses, and non-transitory computer-readable medium described herein may further include operations, features, means, or instructions for determining a first communications configuration for wireless communications at the first wireless device, a second communications configuration for wireless communications at a third wireless device, or both, where transmitting the second indication may be based on the determined first communications configuration, the determined second communications configuration, or both.

Some examples of the method, apparatuses, and non-transitory computer-readable medium described herein may further include operations, features, means, or instructions for communicating with the first wireless device based on the transmitted second indication to adjust the activation state of the one or more antenna elements.

Some examples of the method, apparatuses, and non-transitory computer-readable medium described herein may further include operations, features, means, or instructions for receiving, from the first wireless device, a request for the second wireless device to configure the activation state of the one or more antenna elements, where the second indication may be transmitted based on receiving the request.

In some examples of the method, apparatuses, and non-transitory computer-readable medium described herein, the request includes an indication of a quantity of antenna elements associated with the request, an indication that the request may be associated with the one or more antenna elements, or both.

In some examples of the method, apparatuses, and non-transitory computer-readable medium described herein, receiving the first indication of the one or more parameter values that indicate the structure of the antenna array may include operations, features, means, or instructions for receiving one or more of a first parameter value indicating an arrangement of antenna elements within the antenna array, a second parameter value indicating a quantity of antenna elements within the antenna array, a third parameter value indicating a size of the antenna array, or a fourth parameter value indicating one or more distances between antenna elements of the antenna array, where transmitting the second indication may be based on the one or more of the first parameter value, the second parameter value, the third parameter value, or the fourth parameter value.

In some examples of the method, apparatuses, and non-transitory computer-readable medium described herein, the first parameter value indicating the arrangement of antenna elements within the antenna array includes an indication of a ULA, a URA, a UCA, or any combination thereof.

Some examples of the method, apparatuses, and non-transitory computer-readable medium described herein may further include operations, features, means, or instructions for receiving, from the first wireless device, an indication that an activation state of a subset of antenna elements of the set of antenna elements may be incapable of being modified, where transmitting the second indication may be based on receiving the indication that the activation state of the subset of antenna elements may be incapable of being modified.

In some examples of the method, apparatuses, and non-transitory computer-readable medium described herein, transmitting the second indication to modify the activation state of the one or more antenna elements may include operations, features, means, or instructions for transmitting an indication to modify an LNA metric associated with the one or more antenna elements, a phase shifter metric associated with the one or more antenna elements, a power level metric associated with the one or more antenna elements, or any combination thereof.

In some examples of the method, apparatuses, and non-transitory computer-readable medium described herein, transmitting the second indication to modify the activation state of the one or more antenna elements may include operations, features, means, or instructions for transmitting an indication to deactivate the one or more antenna elements.

In some examples of the method, apparatuses, and non-transitory computer-readable medium described herein, the first indication may be transmitted via an RRC message, a MAC-CE, a UCI message, a CSI report message, or any combination thereof.

In some examples of the method, apparatuses, and non-transitory computer-readable medium described herein, the second indication may be transmitted via an RRC message, a MAC-CE, a DCI message, a feedback message responsive to a CSI report message, or any combination thereof.

Some examples of the method, apparatuses, and non-transitory computer-readable medium described herein may further include operations, features, means, or instructions for transmitting, to the first wireless device, an indication of a second activation state for the set of antenna elements of the antenna array, the second activation state configured for performing transmissions at the first wireless device, receiving a reference signal from the first wireless device based on transmitting the indication of the second activation state, and transmitting, to the first wireless device in response to receiving the reference signal, a third indication to modify the second activation state, to use the second activation state to perform transmissions, or both.

Some examples of the method, apparatuses, and non-transitory computer-readable medium described herein may further include operations, features, means, or instructions for receiving a signal from the first wireless device in accordance with the third indication to modify the second activation state, to use the second activation state to perform transmissions, or both.

Some examples of the method, apparatuses, and non-transitory computer-readable medium described herein may further include operations, features, means, or instructions for receiving, from the first wireless device, a report including an indication of signals received by the first wireless device which were transmitted by a third wireless device, where transmitting the second indication to modify the activation state of the one or more antenna elements of the set of antenna elements of the antenna array may be based on receiving the report.

In some examples of the method, apparatuses, and non-transitory computer-readable medium described herein, the first wireless device includes a UE, a first IAB node, or both, and where the second wireless device includes a base station, a second IAB node, or both.

DETAILED DESCRIPTION

Figure 1:
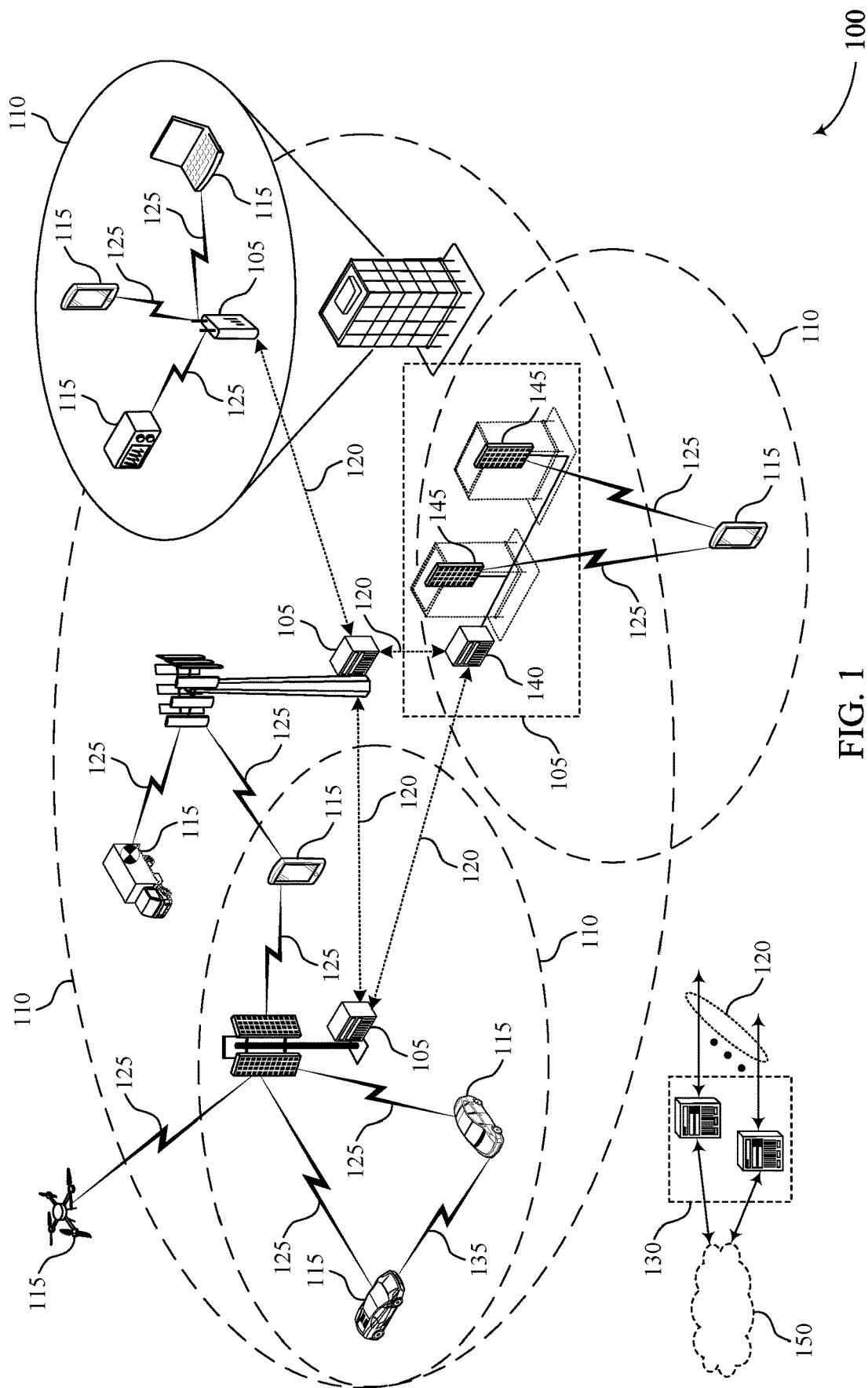
FIG. 1 illustrates an example of a wireless communications system that supports base station reports of user equipment (UE) antenna selection in accordance with aspects of the present disclosure.

In some wireless communications systems, some wireless devices may be configured to communicate using high frequency spectrum, such as millimeter wave (mmW) spectrum and sub-terahertz (THz) spectrum. As the frequency of wireless communications increases, the wavelength of the signals decreases, which results in antenna elements for wireless devices becoming smaller and spaced closer together. Smaller antenna elements may enable higher quantities of antenna elements to be disposed within an antenna array, thereby allowing for beamforming and improved beam spatial separation. However, increasing quantities of antenna elements within an antenna array may correspond to a linear increase of power consumption of the antenna array, which may reduce battery life and overall user experience.

Some wireless devices have attempted to reduce power consumption of an antenna array using lenses (e.g., dielectric lenses) within wireless devices. However, the use of lenses to reduce power consumption is limited by complex implementations and a lack of robustness. Other wireless devices (e.g., UEs) have attempted to reduce power consumption of an antenna array by selectively deactivating a subset of the antenna elements within the antenna array. For example, a UE may reduce power consumption of an antenna array by adjusting an activation state of every other antenna element within the antenna array (e.g., "interleaving" by deactivating every other antenna element). However, by deactivating some antenna elements within the antenna array, spatial separation between the antenna elements is increased, which may lead to unintended grating lobes which are susceptible to interference from other wireless devices. In this regard, the unilateral deactivation of antenna elements by a wireless device (e.g., UE) may improve power consumption, but may result in increased interference and corresponding decrease in the reliability of wireless communications (e.g., due to the creation of grating lobes). Other wireless devices have attempted to improve antenna array power consumption by disabling antenna elements along an edge, or boundary, of the antenna array. However, such techniques may enlarge the beam width and reduce antenna array gain, thereby making these techniques undesirable.

Accordingly, techniques for configuring activation states of antenna elements are disclosed. In particular, techniques described herein are directed to signaling between wireless devices (e.g., UEs, base stations, integrated access and backhaul (IAB) nodes) which enable a second wireless device (e.g., base station) to modify activation states of antenna elements of a first wireless device (e.g., UEs). By enabling wireless devices to modify activation states of other wireless devices based on knowledge of wireless communications within the network, such techniques may provide for improved antenna array power consumption, while simultaneously reducing interference attributable to grating lobes. For example, a UE may indicate, to a base station, that it is capable of configuring (e.g., modifying, adjusting) activation states of antenna elements within an antenna array. The UE may also report parameters associated with the structure of the antenna array, such as an arrangement of antenna elements, size of antenna array, quantity of antenna elements, or any combination thereof. The base station may subsequently instruct the UE to modify an activation state of one or more antenna elements using the determined parameters of the antenna array. The UE may then determine (e.g., modify, adjust) activation states of antenna elements of the antenna array, which may reduce power consumption at the UE and improve battery performance.

In some cases, the base station may additionally determine one or more characteristics of the network and may and instruct the UE to modify the activation state of the antenna elements based on both the determined parameters of the antenna array and the determined characteristics of the network. Network characteristics which may be used to selectively modify the activation states of antenna elements may include positions of UEs within the network, uplink/downlink configurations for the UEs within the network, or both. For instance, the base station may determine the position of the UE relative to other UEs within the network, and may instruct the UE to modify the activation state of the one or more antenna elements based on the structure of the antenna array and the relative positions of the UEs such that grating nodes generated by the modification of the antenna elements does not result in interference from the other UEs.

The techniques described herein may enable wireless devices (e.g., base stations, IAB nodes) to selectively modify activation states of antenna elements of other wireless devices (e.g., UEs, IAB nodes) based on the structure of antenna elements and network characteristics, which may thereby provide for reduced power consumption of the antenna arrays and reduced interference as compared to other techniques.

Aspects of the disclosure are initially described in the context of wireless communications systems. Additional aspects of the disclosure are also described in the context of an example process flow. Aspects of the disclosure are further illustrated by and described with reference to apparatus diagrams, system diagrams, and flowcharts that relate to base station reports of UE antenna selection.

FIG. 1 illustrates an example of a wireless communications system 100 that supports base station reports of UE antenna selection in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), highest signal-to-interference-plus-noise ratio (SINR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and base stations 105 of the wireless communications system 100 may support signaling which enables a second wireless device (e.g., base station 105) to modify activation states of antenna elements of a first wireless device (e.g., UE 115). In particular, techniques described herein may enable a base station 105 of the wireless communications system 100 to modify activation states of antenna elements of UEs 115 based on information regarding the structure of antenna arrays at the UEs 115 and network conditions within the wireless communications system 100. By enabling wireless devices (e.g., base stations 105, IAB nodes) to modify activation states of other wireless devices (e.g., UEs 115, IAB nodes) based on knowledge of wireless communications within the wireless communications system 100, such techniques may provide for improved antenna array power consumption, while simultaneously reducing interference attributable to grating lobes. As noted previously herein, the decrease of antenna array power consumption coupled with the reduced interference attributable to grating lobes may be particularly beneficial in the context of high-frequency wireless communications, such as wireless communications carried out over mmW spectrum, sub-THz spectrum, or both.

For example, a UE 115 of the wireless communications system 100 may indicate, to a base station 105, that it is capable of configuring (e.g., modifying, adjusting) activation states of antenna elements within an antenna array of the UE 115. The UE 115 may also report parameters associated with the structure of the antenna array, such as an arrangement of antenna elements, size of antenna array, quantity of antenna elements, or any combination thereof. The base station 105 may subsequently instruct the UE 115 to modify an activation state of one or more antenna elements using the determined parameters of the antenna array, which may enable the UE 115 to reduce a power consumption of the antenna array while simultaneously reducing or eliminating interference at the antenna array which may result from other techniques.

In some cases, the base station 105 may additionally determine one or more characteristics of the network (e.g., one or more characteristics of the wireless communications system 100) and may and instruct the UE 115 to modify the activation state of the antenna elements based on both the determined parameters of the antenna array and the determined characteristics of the network. Network characteristics which may be used to selectively modify the antenna elements may include positions of UEs 115 within the network, uplink/downlink configurations for the UEs 115 within the network, or both. For instance, the base station 105 may determine the position of the UE 115 relative to other UEs 115 within the network, and may instruct the UE 115 to modify the activation state of the one or more antenna elements based on the structure of the antenna array and the relative positions of the UEs 115 such that grating nodes generated by the modification of the antenna elements does not result in interference from the other UEs 115.

Techniques described herein may enable wireless devices (e.g., base stations 105, IAB nodes) to selectively modify activation states of antenna elements of other wireless devices (e.g., UEs 115, IAB nodes) based on the structure of antenna elements and network characteristics. By enabling for the selective modification of activation states associated with antenna elements based on the structure of an antenna array as well as network characteristics, techniques described herein may provide for reduced power consumption of the antenna arrays while also reducing or eliminating interference which may result from other power saving techniques.

Figure 2:
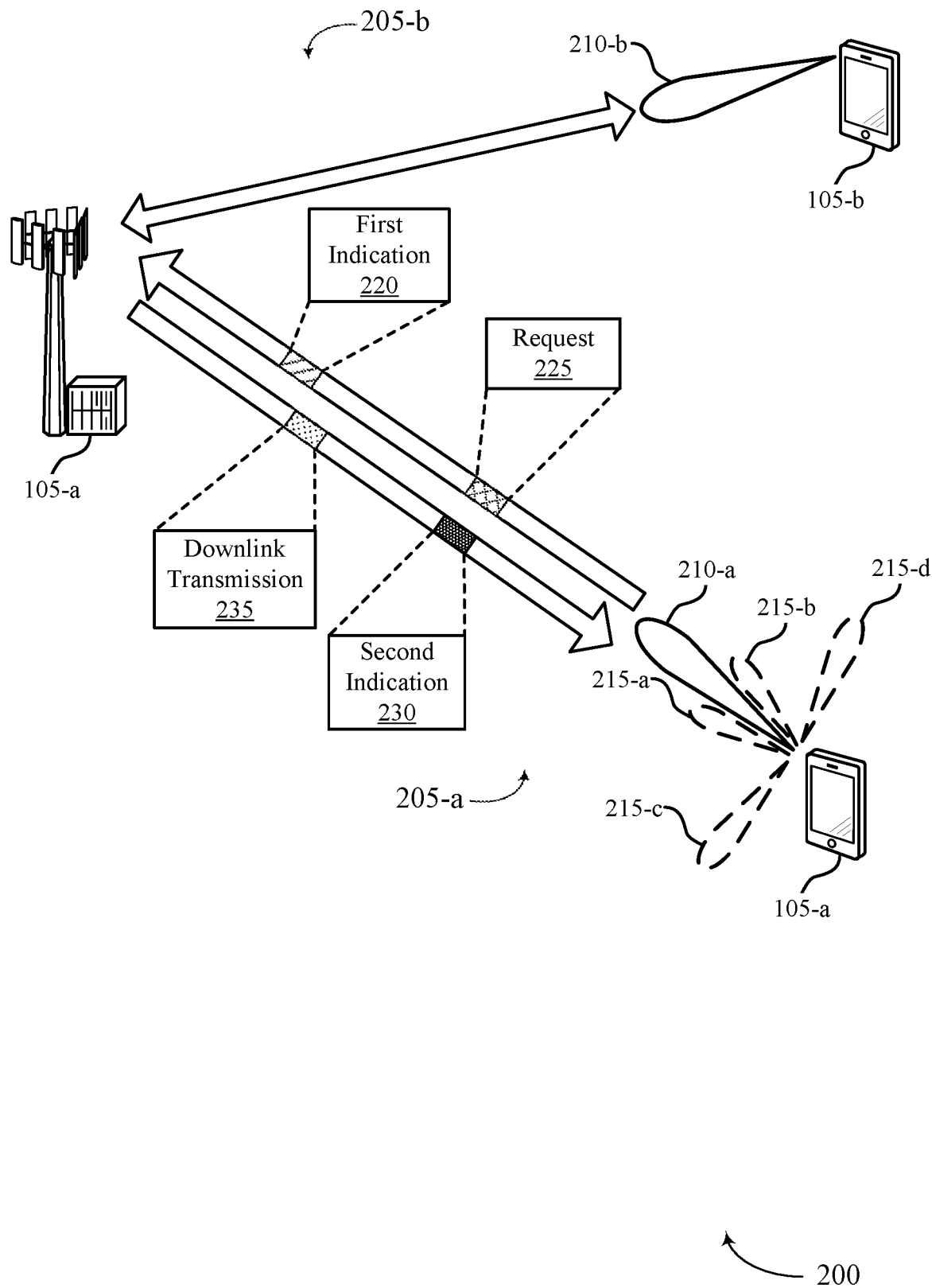
FIG. 2 illustrates an example of a wireless communications system that supports base station reports of UE antenna selection in accordance with aspects of the present disclosure.

FIG. 2 illustrates an example of a wireless communications system 200 that supports base station 105 reports of UE 115 antenna selection in accordance with aspects of the present disclosure. In some examples, wireless communications system 200 may implement, or be implemented by, aspects of wireless communications system 100. The wireless communications system 200 may include a first UE 115-a, a second UE 115-b, and a base station 105-a, which may be examples of UEs 115 and base stations 105, as described with reference to FIG. 1.

The first UE 115-a and the second UE 115-b may communicate with the base station 105-a using a communication link 205-a and a communication link 205-b, respectively, which may be examples of NR or LTE links between the first UE 115-a and the second UE 115-b, respectively, and the base station 105-a. In some cases, the communication links 205-a and 205-b may include examples of access links (e.g., Uu links). The communication links 205-a and 205-b may include bi-directional links that enable both uplink and downlink communication. For example, the first UE 115-a may transmit uplink signals, such as uplink control signals or uplink data signals, to the base station 105-a using the first communication link 205-a and the base station 105-a may transmit downlink signals, such as downlink control signals or downlink data signals, to the first UE 115-a using the communication link 205-a. By way of another example, the second UE 115-b may transmit uplink signals, such as uplink control signals or uplink data signals, to the base station 105-a using the first communication link 205-b and the base station 105 may transmit downlink signals, such as downlink control signals or downlink data signals, to the second UE 115-b using the communication link 205-b.

In some aspects, each of the first UE 115-a and the second UE 115-b may be configured to communicate with the base station 105-a using an antenna array. Each antenna array may include one or more antenna elements. In some aspects, the first UE 115-a may be capable of determining (e.g., modifying, adjusting) characteristics of the antenna elements independently from one another. For example, the first UE 115-a may be configured to determine (e.g., modify, adjust) an activation state (e.g., low noise amplifier (LNA) metric, phase shifter metric, power level) of at least a subset of the antenna elements of the antenna array independently from one another.

In some aspects, the first UE 115-a and the second UE 115-b may be configured to communicate with the base station 105-a via one or more beams 210-a and 210-b, respectively. For example, the first UE 115-a may be configured to communicate with the base station 105-a over communication link 205-a via one or more beams 210-a (e.g., one or more primary beams 210-a). Similarly, the second UE 115-b may be configured to communicate with the base station 105-a over communication link 205-b via one or more beams 210-b (e.g., one or more primary beams 210-b). Characteristics of the beams 210-a and 210-b (e.g., shape, orientation, size) may be modified via beamforming techniques described herein. For example, parameters/characteristics of the antenna array (e.g., structure of the antenna array) may be associated with or determine characteristics of beams which are formable (e.g., may be generated) by the antenna array, including an orientation of primary beams 210, a presence (or lack thereof) of grating lobes, an orientation of grating lobes, a size or shape of formed (e.g., generated) beams/grating lobes, or any combination thereof. Moreover, as will be described in further detail herein, characteristics of the beams 210-a and 210-b, such as the power consumption of the antenna arrays used to generate the beams 210-a and 210-b, may be determined and/or selectively modified by selectively adjusting activation states of antenna elements within the respective antenna arrays.

As noted previously herein, some wireless devices (e.g., UEs 115) have attempted to reduce power consumption of an antenna array by selectively deactivating a subset of the antenna elements within the antenna array. For example, according to some conventional techniques, the first UE 115-a may reduce power consumption of an antenna array of the first UE 115-a by adjusting an activation state of every other antenna element within the antenna array (e.g., "interleaving" by deactivating every other antenna element). Adjusting activation states of a subset of antenna elements of the antenna array may enable the first UE 115-a to reduce power consumption of the antenna array while enabling the first UE 115-a to continue wireless communications with the base station 105-a via communication link 205-a and the one or more beams 210-a. However, by deactivating some antenna elements within the antenna array of the first UE 115-a, spatial separation between the antenna elements is increased, which may lead to unintended grating lobes 215 which are susceptible to interference from other wireless devices (e.g., second UE 115-b). In this regard, the structure of the antenna array (e.g., spatial separation between antenna elements) may affect characteristics of beams which are formed by the antenna array, including the presence (or lack thereof) of unintended grating lobes 215. For example, unilaterally modifying activation states of some antenna elements within the antenna array of the first UE 115-a may generate grating lobes 215-a, 215-b, 215-c, and 215-d which may be susceptible to interference. In particular, depending on the position of the UEs 115-a and 115-b and the orientation of grating lobes 215, the grating lobes 215 may be susceptible to interference attributable to wireless communications transmitted from the second UE 115-b to the base station 105-a and/or other wireless devices. In this regard, the unilateral deactivation of antenna elements by a wireless device (e.g., first UE 115-a) may improve power consumption, but may result in increased interference and corresponding decrease in the reliability of wireless communications (e.g., due to the creation of grating lobes 215).

Accordingly, the UEs 115 and the base station 105-a of the wireless communications system 200 may support signaling which enables a second wireless device (e.g., base station 105-a) to modify activation states of antenna elements of a first wireless device (e.g., first UE 115-a). In particular, techniques described herein may enable the base station 105-a of the wireless communications system 200 to modify activation states of antenna elements of UEs 115-a and/or 115-b based on information regarding the structure of antenna arrays at the UEs 115 and network conditions within the wireless communications system 200. By enabling the base station 105-a to modify activation states of other wireless devices (e.g., UEs 115) based on knowledge of wireless communications within the wireless communications system 200, such techniques may provide for improved antenna array power consumption, while simultaneously reducing interference attributable to grating lobes 215.

For example, the first UE 115-a may transmit, to the base station 105-a, a first indication 220 of a capability to selectively configure activation states for one or more antenna elements of an antenna array of the first UE 115-a. In some aspects, the first indication 220 may also include an indication of one or more parameter values indicative of a structure of the antenna array of the first UE 115-a. In some aspects, the first indication 220 may be transmitted via an RRC message, a media access control-control element (MAC-CE) message, an uplink control information (UCI) message, a channel state information (CSI) report message, or any combination thereof. In some aspects, the first UE 115-a may transmit the first indication 220 based on performing a beam management procedure.

The one or more parameter values indicative of the structure of the antenna array may include, but are not limited to, parameter values indicating an arrangement of antenna elements within the antenna array, parameter values indicating a quantity of antenna elements within the antenna array, parameter values indicating a position of each element within the antenna array, parameter values indicating a size of the antenna array (e.g., width, length, other dimensions), parameter values indicating one or more distances between elements of the antenna array (e.g., separation distances along the x-direction, separation distances along the y-direction), parameter values indicating supported parameters/characteristics of one or more phase shifters of the antenna array (e.g., supported range of phase shifter phases, supported range of phase shifter amplitudes), or any combination thereof. For example, the one or more parameter values may include parameter values indicating an arrangement of antenna elements within the antenna array of the first UE 115-a, where the one or more parameter values indicate that the antenna array includes a unified linear array (ULA), a unified rectangular array (URA), a unified circular array (UCA), or any combination thereof.

In some aspects, the first indication 220 of the capability to selectively configure activation states for one or more antenna elements of an antenna array may additionally or alternatively include an indication that an activation state of a subset of antenna elements of a set of antenna elements of an antenna array is incapable of being modified. For example, the first indication 220 may include an indication that the first UE 115-a is capable of selectively configuring activation states for a first subset of antenna elements of a set of antenna elements of an antenna array, and an indication that the first UE 115-a is incapable of selectively configuring activation states for a second subset of antenna elements of the set of antenna elements of the antenna array.

In some aspects, the first indication 220 of the capability to selectively configure activation states for one or more antenna elements of an antenna array may additionally or alternatively include an indication that the first UE 115-a has the capability to change the power received from each antenna (e.g., a capability of tapering, beam steering), or a number of possible attenuations, or both.

In some aspects, the first UE 115-a may transmit, to the base station 105-a, a request 225 for the base station 105-a to configure an activation state of one or more antenna elements of the antenna array of the first UE 115-a. In some aspects, the first UE 115-a may transmit the request 225 based on transmitting the first indication 220 of the capability and the antenna array parameters. In some cases, the first UE 115-a may transmit the request 225 in order to reduce a power consumption of the antenna array at the first UE 115-a. For example, the first UE 115-a may receive a command (e.g., input from a user) to enter a lower power mode of operation, and may thereby transmit the request 225 based on identifying the command.

In some aspects, the request 225 may include an indication as to a quantity of antenna elements associated with the request 225, an indication as to which antenna elements are associated with the request 225, or both. For example, the first indication 220 may indicate that the antenna array includes ten antenna elements (e.g., antenna elements 1 through 10). In this example, the first UE 115-a may indicate, to the base station 105-a via the request 225, a desire to selectively determine or modify an activation state of antenna element numbers 1, 3, and 7.

In some aspects, the base station 105-a may determine a position of the first UE 115-a, the second UE 115-b, or both. In some aspects, the base station 105-a may determine a position of the first UE 115-a relative to other wireless devices within the wireless communications system 200, and vice versa. The base station 105-a may determine the position of the first UE 115-a and/or additional wireless devices (e.g., second UE 115-b) based on reports received from the network and/or the wireless devices themselves, based on characteristics of signals received from the wireless devices (e.g., received signal strength indicator (RSSI), reference signal received power (RSRP), reference signal received quality (RSRQ)), and the like.

Additionally or alternatively, the base station 105-a may determine communications configurations associated with the first UE 115-a, the second UE 115-b, or both. Communications configurations may include configurations or formats of resources configured for uplink communications, downlink communications, flexible communications, and/or full duplex communications at each of the respective UEs 115. For example, the base station 105-a may determine a first communications configuration for wireless communications at the first UE 115-a, a second communications configuration for wireless communications at the second UE 115-b, or both.

In some aspects, by determining the positions and/or communications configurations of the first UE 115-a and/or the second UE 115-b, the base station 105-a may be configured to estimate a probability and/or severity of interference experienced at the first UE 115-a which is attributable to signals transmitted by the second UE 115-b. The base station 105-a may then use estimated probability and/or severity of interference experienced at the first UE 115-a to determine antenna element activation states which should be used by the first UE 115-a. For example, the base station 105-a may identify a high probability of interference at the first UE 115-a in cases where relative positions of the first UE 115-a and the second UE 115-b suggest that that the first UE 115-a may be in a position to receive (e.g., intercept) signals transmitted by the second UE 115-b. Additionally or alternatively, the base station 105-a may identify a high probability of interference at the first UE 115-a based on the communications configurations of the first UE 115-a and the second UE 115-b. For example, the base station 105-a may determine a first communications configuration associated with the first UE 115-a and a second communications configuration associated with the second UE 115-b. In this example, the base station 105-a may identify a high probability of interference at the first UE 115-a based on determining that a set of downlink resources of the first communications configuration associated with the first UE 115-a overlap with a set of uplink resources of the second communications configuration associated with the second UE 115-b in the time domain. In these examples, the base station 105-a may utilize the estimated probability and/or severity of interference at the first UE 115-a in order to determine activation states of antenna elements which should be used by the first UE 115-a.

In some cases, the base station 105-a may estimate a probability and/or severity of interference experienced at the first UE 115-a which is attributable to signals transmitted by the additional wireless devices (e.g., other UEs 115, other base stations 105, other transmission-reception points (TRPs)). In this regard, the base station 105-a may identify other wireless devices which may potentially cause interference at the first UE 115-a. In some aspects, the base station 105-a may estimate a probability and/or severity of interference experienced at the first UE 115-a based on reports or other signaling received from the first UE 115-a. For example, the first UE 115-a may identify (e.g., receive) signals transmitted by an additional wireless device (not shown). In this example, the first UE 115-a may perform one or more measurements (e.g., RSSI measurements, RSRQ measurements, RSRP measurements, SNR measurements, SINR measurements) on the received signals. Subsequently, the first UE 115-a may transmit, to the base station 105-a, a report (e.g., measurement report) including an indication of the signals (e.g., indication of the performed measurements) transmitted by the additional wireless device. For instance, the first UE 115-a may transmit a report indicating RSSI measurements of the received signals. The base station 105-*a* may then estimate a probability and/or severity of interference at the first UE 115-*a* in order to determine activation states of antenna elements which should be used by the first UE 115-*a*.

In some aspects, the base station 105-*a* may determine an activation state for one or more antenna elements of the first UE 115-*a* based on receiving the first indication 220, receiving the request 225, or both. Moreover, the base station 105-*a* may determine the activation state based on the determined positions of the UEs 115-*a* and 115-*b*, the determined communications configurations of the UEs 115-*a* and 115-*b*, reports (e.g., measurement reports) received from the first UE 115-*a*, or any combination thereof. For example, the base station 105-*a* may determine an activation state of the one or more antenna elements based on the parameter values indicative of the structure of the antenna array of the first UE 115-*a* and the ability (or inability) of the first UE 115-*a* to configure activation states of the respective antenna elements.

In some aspects, the base station 105-*a* may determine an activation state for the one or more antenna elements which will reduce or eliminate potential interference attributable to grating lobes 215 generated as a result of the determined activation state. For example, the base station 105-*a* may determine an activation state for the one or more antenna elements which will generate grating lobes 215 that will be less susceptible to interference from the second UE 115-*b* (e.g., grating lobes 215 which are not oriented in the direction of potential interferers). In this regard, the base station 105-*a* may determine the activation state for the one or more antenna elements which will enable the first UE 115-*a* to experience little or no performance loss, while simultaneously benefitting from a large power reduction. In other words, the base station 105-*a* may determine an activation state for the one or more antenna elements which may adjust (e.g., deactivate, attenuate, taper, adjust a provided voltage) as many antenna elements as possible without significantly increasing interference which will be experienced by the first UE 115-*a*.

Upon determining an activation state for the one or more antenna elements of the first UE 115-*a*, the base station 105-*a* may transmit, to the first UE 115-*a*, a second indication 230 for the first UE 115-*a* to modify an activation state of the one or more antenna elements of the antenna array of the first UE 115-*a*. In some aspects, the second indication 230 may be transmitted via an RRC message, a MAC-CE message, a downlink control information (DCI) message, a feedback message responsive to a CSI report message, or any combination thereof. Moreover, in some aspects, the base station 105-*a* may transmit the second indication 230 periodically (e.g., periodic report), aperiodically (e.g., aperiodic report), or both. For example, the base station 105-*a* may transmit a second indication 230 periodically over time as characteristics of the network change (e.g., as position of first UE 115-*a* relative to the second UE 115-*b* changes, as communications configurations of the UEs 115 change).

The base station 105-*a* may transmit the second indication 230 based on receiving the first indication 220, receiving the request 225, determining the position of the first UE 115-*a* and/or second UE 115-*b*, determining communications configurations associated with the first UE 115-*a* and/or second UE 115-*b*, determining the activation state for the one or more antenna elements of the first UE 115-*a*, or any combination thereof. Additionally or alternatively, the base station 105-*a* may transmit the second indication 230 based on receiving a report (e.g., measurement report) indicative of signals received by the first UE 115-*a* which were transmitted by the second UE 115-*b*.

In some aspects, the second indication 230 may additionally include an indication of which antenna elements of the antenna array are to be identified (e.g., modified, adjusted) in response to the second indication 230. In some aspects, the second indication 230 to modify the activation state of the one or more antenna elements may be based on the capability (or lack thereof) of the first UE 115-*a* to configure activation states of the one or more antenna elements of the antenna array. Moreover, the second indication 230 to modify the activation state of the one or more antenna elements may be based on the one or more parameter values indicative of the structure of the antenna array (e.g., parameter values indicating an arrangement of antenna elements, parameter values indicating a quantity of antenna elements, parameter values indicating a size of the antenna array, parameter values indicating one or more distances between antenna elements).

In some aspects, the second indication 230 to modify the activation state of the one or more antenna elements may include an indication to selectively modify one or more characteristics or components of the one or more antenna elements. The second indication 230 may be used for the purposes of beam steering at the first UE 115-*a*. For example, the second indication 230 may include an indication for the first UE 115-*a* to modify an LNA metric associated with the one or more antenna elements, a phase shifter metric associated with the one or more antenna elements (e.g., phase, amplitude), a power level metric associated with the one or more antenna elements, or any combination thereof. For instance, the second indication 230 may include an indication for the first UE 115-*a* to deactivate the one or more antenna elements of the antenna array (e.g., reduce a voltage provided to components of the antenna array, such as phase shifters). By way of another example, the second indication 230 may include an indication for the first UE 115-*a* to taper or attenuate the one or more antenna elements of the antenna array. In this example, the second indication 230 may indicate which attenuations the first UE 115-*a* is to perform at each of the one or more antenna elements and may include mappings between attenuations and antenna elements, for example as attenuation-antenna element pairs.

In some aspects, the first UE 115-*a* may identify the activation state of the one or more antenna elements of the antenna array of the first UE 115-*a*. In some aspects, the first UE 115-*a* may identify the activation state of the one or more antenna elements based on receiving the second indication 230 for the first UE 115-*a* to modify the activation state of the one or more antenna elements. For example, upon receiving the second indication 230 for the first UE 115-*a* to modify the activation state of the one or more antenna elements, the first UE 115-*a* may identify (e.g., determine, modify, adjust) the activation state of the one or more antenna elements in accordance with (e.g., based on, in response to) the second indication 230. For instance, the first UE 115-*a* may determine (e.g., modify, adjust) an LNA metric associated with the one or more antenna elements, a phase shifter metric associated with the one or more antenna elements, a power level metric associated with the one or more antenna elements (e.g., active state, inactive state), or any combination thereof, based on the second indication 230. For instance, the first UE 115-*a* may modify a voltage which is provided to one or more components (e.g., phase shifters, LNAs, power amplifiers (PAs), other amplifiers) of antenna elements of the antenna array. In some aspects, the first UE 115-a may modify the activation of one or more antenna elements to perform beam steering.

Upon receiving the second indication 230 to modify the activation state of the one or more antenna elements, the first UE 115-a may communicate with the base station 105-a using the antenna array according to the identified activation state of the one or more antenna elements. In this regard, the first UE 115-a and the base station 105-a may communicate with one another based on transmitting or receiving the first indication 220, transmitting or receiving the request 225, determining the positions of the first UE 115-a and/or second UE 115-b, determining the communications configurations associated with the first UE 115-a and/or second UE 115-b, transmitting or receiving the second indication 230, identifying the activation state of the one or more antenna elements, or any combination thereof. For example, the first UE 115-a may receive downlink transmissions 235 from the base station 105-a using the antenna array which includes antenna elements including activation states which were identified (e.g., modified, adjusted) based on the second indication 230 received from the base station 105-a.

In some aspects, the first UE 115-a and the base station 105-a may additionally or alternatively identify (e.g., modify, adjust) activation states of antenna elements at the antenna array for performing transmissions (e.g., uplink transmissions) at the first UE 115-a. For example, in some cases, the base station 105-a may transmit, to the first UE 115-a, an indication of a second activation state configured for performing transmissions at the first UE 115-a. In some aspects, the second activation state configured for performing transmissions at the first UE 115-a may be the same or different from the activation state for receiving downlink transmissions at the first UE 115-a.

Continuing with the same example, the first UE 115-a may identify the second activation state configured for performing transmissions (e.g., uplink transmissions). In some aspects, the first UE 115-a may identify the second activation state based on receiving the indication of the second activation state from the base station 105-a. In some aspects, the first UE 115-a may identify (e.g., modify, adjust) the activation state of the one or more antenna elements associated with the second activation state in accordance with (e.g., based on, in response to) the second activation state. For instance, the first UE 115-a may determine (e.g., modify, adjust) an LNA metric associated with the one or more antenna elements, a phase shifter metric associated with the one or more antenna elements (e.g., phase shifter phase and/or amplitude), a power level metric associated with the one or more antenna elements (e.g., active state, inactive state), or any combination thereof, based on the indication of the second activation state received from the base station 105-a.

Subsequently, the first UE 115-a may transmit a reference signal (e.g., sounding reference signal (SRS) or another uplink reference signal) to the base station 105-a according to the second activation state. In this regard, the first UE 115-a may transmit the reference signal based on receiving the indication of the second activation state from the base station 105-a, identifying the second activation state, or both. In some aspects, the base station 105-a may transmit, to the first UE 115-a, a third indication based on (e.g., in response to) receiving the reference signal from the first UE 115-a. In some aspects, the third indication may include an instruction for the first UE 115-a to modify the second activation state, an instruction for the first UE 115-a to use the second activation state to perform uplink transmissions, or both. For example, dependent on characteristics (e.g., RSSI, RSRP, RSRQ, SNR, SINR) of the reference signal received from the first UE 115-a and transmitted according to the second activation state, the base station 105-a may determine whether the first UE 115-a should use the second activation state to perform uplink transmissions and/or modify the second activation state in order to perform the uplink transmissions.

In some aspects, the first UE 115-a may communicate with the base station 105-a using the antenna array according to the third indication to modify and/or use the second activation state. In this regard, the first UE 115-a and the base station 105-a may communicate with one another based on transmitting or receiving the indication of the second activation state, identifying the second activation state, transmitting or receiving the reference signal, transmitting or receiving the third indication to modify or use the second activation state, or any combination thereof. For example, the first UE 115-a may transmit a signal (e.g., uplink transmission) to the base station 105-a in accordance with the third indication to modify the second activation state, to use the second activation state to perform transmissions, or both.

Techniques described herein may enable wireless devices (e.g., base station 105-a) to selectively modify activation states of antenna elements of other wireless devices (e.g., first UE 115-a) based on the structure of antenna elements and network characteristics. By enabling for the selective modification of activation states associated with antenna elements based on the structure of an antenna array as well as network characteristics, techniques described herein may provide for reduced power consumption of the antenna arrays while also reducing or eliminating interference which may result from other power saving techniques.

Figure 3:
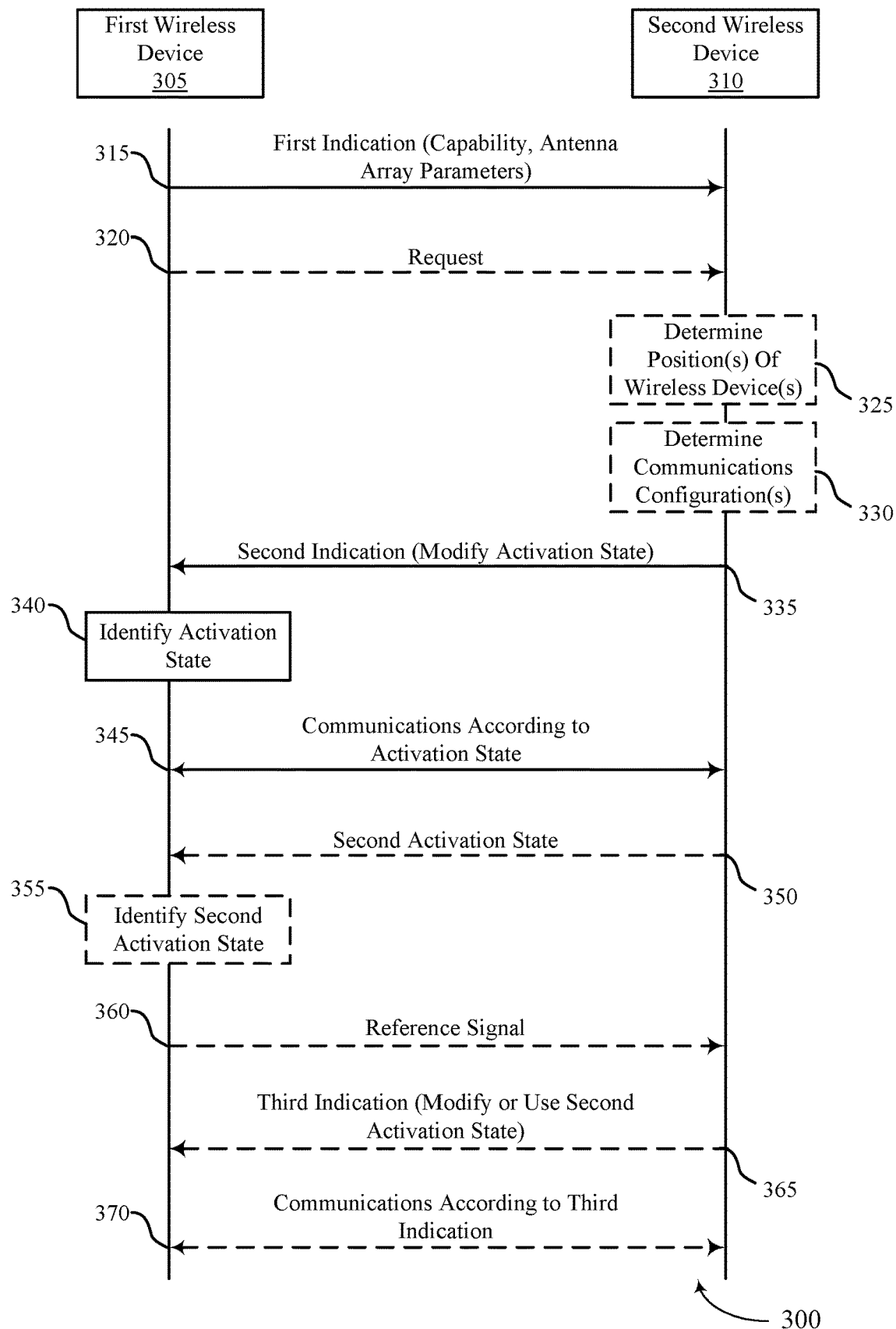
FIG. 3 illustrates an example of a process flow that supports base station reports of UE antenna selection in accordance with aspects of the present disclosure.

FIG. 3 illustrates an example of a process flow 300 that supports base station reports of UE antenna selection in accordance with aspects of the present disclosure. In some examples, process flow 300 may implement, or be implemented by, aspects of wireless communications system 100, wireless communications system 200, or both. For example, the process flow 300 may illustrate a first wireless device 305 transmitting a first indication of a capability and antenna array parameters to a second wireless device 310, and identifying an activation state of one or more antenna elements based on a second indication received from a second wireless device 310, as described with reference to FIGS. 1-2.

In some cases, process flow 300 may include a first wireless device 305 and a second wireless device 310, which may be examples of corresponding devices as described herein. In particular, the first wireless device 305 may include an example of a UE 115, a first IAB node, or both, and the second wireless device 310 may include an example of a base station 105, a second IAB node, or a second UE 115. For example, the first wireless device 305 illustrated in FIG. 3 may be an example of the first UE 115-a illustrated in FIG. 2. Similarly, the second wireless device 310 illustrated in FIG. 3 may be an example of the base station 105-a illustrated in FIG. 2. However, it may be understood that the first wireless device 305 and the second wireless device 310 illustrated in FIG. 3 may include any wireless device known in the art.

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 315, the first wireless device 305 may transmit, to the second wireless device 310, a first indication of a capability to selectively configure activation states for one or more antenna elements of an antenna array of the first wireless device 305. In some aspects, the first indication transmitted at 315 may also include an indication of one or more parameter values indicative of a structure of the antenna array of the first wireless device. In some aspects, the first indication may be transmitted via an RRC message, a MAC-CE message, a UCI message, a CSI report message, or any combination thereof.

The one or more parameter values indicative of the structure of the antenna array may include, but are not limited to, parameter values indicating an arrangement of antenna elements within the antenna array, parameter values indicating a quantity of antenna elements within the antenna array, parameter values indicating a size of the antenna array (e.g., width, length, other dimensions), parameter values indicating one or more distances between elements of the antenna array (e.g., separation distances along the x-direction, separation distances along the y-direction), or any combination thereof. For example, the one or more parameter values may include parameter values indicating an arrangement of antenna elements within the antenna array, where the one or more parameter values indicate that the antenna array includes a ULA, a URA, a UCA, or any combination thereof.

In some aspects, the first indication of the capability to selectively configure activation states for one or more antenna elements of an antenna array may additionally or alternatively include an indication that an activation state of a subset of antenna elements of a set of antenna elements of an antenna array is incapable of being modified. For example, the first indication transmitted at 315 may include an indication that the first wireless device 305 is capable of selectively configuring activation states for a first subset of antenna elements of a set of antenna elements of an antenna array, and an indication that the first wireless device 305 is incapable of selectively configuring activation states for a second subset of antenna elements of the set of antenna elements of the antenna array.

At 320, the first wireless device 305 may transmit, to the second wireless device 310, a request for the second wireless device to configure an activation state of one or more antenna elements of the antenna array of the first wireless device 305. In some aspects, the first wireless device 305 may transmit the request at 320 based on transmitting the first indication of the capability and the antenna array parameters at 315. In some cases, the first wireless device 305 may transmit the request in order to reduce a power consumption of the antenna array at the first wireless device 305. For example, the first wireless device 305 may receive a command (e.g., input from a user) to enter a lower power mode of operation, and may thereby transmit the request at 320 based on identifying the command.

In some aspects, the request may include an indication as to a quantity of antenna elements associated with the request, an indication as to which antenna elements are associated with the request, or both. For example, the first indication transmitted at 315 may indicate that the antenna array includes ten antenna elements (e.g., antenna elements 1 through 10). In this example, the first wireless device 305 may indicate, to the second wireless device 310 via the request, a desire to selectively determine or modify an activation state of antenna element numbers 1, 3, and 7.

At 325, the second wireless device 310 may determine a position of the first wireless device 305. In some aspects, the second wireless device may additionally determine a position of one or more additional wireless devices (e.g., one or more additional UEs 115 and/or IAB nodes) within the respective wireless communications system. For example, as shown in FIG. 2, the base station 105-a (e.g., second wireless device 310) may determine a position of the first UE 115-a (e.g., first wireless device 305), a position of the second UE 115-b (e.g., additional wireless device), or both. In some aspects, the second wireless device 310 may determine a position of the first wireless device 305 relative to other wireless devices within the network, and vice versa. The second wireless device 310 may determine the position of the first wireless device 305 and/or additional wireless devices based on reports received from the network and/or the wireless devices themselves, based on characteristics of signals received from the wireless devices (e.g., RSSI, RSRP, RSRQ), and the like.

At 330, the second wireless device 310 may determine communications configurations associated with the first wireless device 305, additional wireless devices (not shown), or both. Communications configurations may include configurations or formats of resources configured for uplink communications, downlink communications, flexible communications, and/or full duplex communications at each of the respective wireless devices. For example, as shown in FIG. 2, the base station 105-a (e.g., second wireless device 310) may determine a first communications configuration for wireless communications at the first UE 115-a (e.g., first wireless device 305), a second communications configuration for wireless communications at the second UE 115-b (e.g., additional wireless device), or both.

In some aspects, by determining the positions and/or communications configurations of the first wireless device 305 and/or additional wireless devices within the network, the second wireless device 310 may be configured to estimate a probability and/or severity of interference experienced at the first wireless device which is attributable to signals transmitted by the additional wireless devices. For example, the second wireless device 310 may identify a high probability of interference at the first wireless device 305 in cases where relative positions of the first wireless device 305 and an additional wireless device suggest that that the first wireless device 305 may be in a position to intercept signals transmitted by the additional wireless device. Additionally or alternatively, the second wireless device 310 may identify a high probability of interference at the first wireless device 305 based on the communications configurations of the first wireless device 305 and an additional wireless device. For example, the second wireless device 310 may determine a first communications configuration associated with the first wireless device 305 and a second communications configuration associated with an additional wireless device. In this example, the second wireless device 310 may identify a high probability of interference at the first wireless device 305 based on determining that a set of downlink resources of the first communications configuration associated with the first wireless device 305 overlap with a set of uplink resources of the second communications configuration associated with the additional wireless device in the time domain. In these examples, the second wireless device 310 may utilize the estimated probability and/or severity of interference at the first wireless device 305 in order to determine activation states of antenna elements which should be used by the first wireless device 305.

In some cases, the second wireless device 310 may estimate a probability and/or severity of interference experienced at the first wireless device 305 which is attributable to signals transmitted by the additional wireless devices based on reports or other signaling received from the first wireless device 305. For example, the first wireless device 305 may identify (e.g., receive) signals transmitted by an additional wireless device (not shown). In this example, the first wireless device 305 may perform one or more measurements (e.g., RSSI measurements, RSRQ measurements, RSRP measurements, SNR measurements, SINR measurements) on the received signals. Subsequently, the first wireless device 305 may transmit, to the second wireless device 310, a report (e.g., measurement report) including an indication of the signals (e.g., indication of the performed measurements) transmitted by the additional wireless device. For instance, the first wireless device 305 may transmit a report indicating RSSI measurements of the received signals. The second wireless device 310 may then estimate a probability and/or severity of interference at the first wireless device 305 in order to determine activation states of antenna elements which should be used by the first wireless device 305.

At 335, the second wireless device 310 may transmit, to the first wireless device, a second indication for the first wireless device 305 to modify an activation state of one or more antenna elements of the antenna array of the first wireless device 305. In some aspects, the second indication may be transmitted via an RRC message, a MAC-CE message, a DCI message, a feedback message responsive to a CSI report message, or any combination thereof.

The second wireless device 310 may transmit the second indication at 335 based on receiving the first indication at 315, receiving the request at 320, determining the position of the first wireless device 305 and/or additional wireless devices at 325, determining communications configurations associated with the first wireless device 305 and/or additional wireless devices at 330, or any combination thereof. Additionally or alternatively, the second wireless device 310 may transmit the second indication at 335 based on receiving a report (e.g., measurement report) indicative of signals received by the first wireless device 305 which were transmitted by an additional wireless device.

In some aspects, the second indication may additionally include an indication of which antenna elements of the antenna array are to be identified (e.g., modified, adjusted) in response to the second indication. In some aspects, the second indication to modify the activation state of the one or more antenna elements may be based on the capability (or lack thereof) of the first wireless device 305 to configure activation states of the one or more antenna elements of the antenna array. Moreover, the second indication to modify the activation state of the one or more antenna elements may be based on the one or more parameter values indicative of the structure of the antenna array (e.g., parameter values indicating an arrangement of antenna elements, parameter values indicating a quantity of antenna elements, parameter values indicating a size of the antenna array, parameter values indicating one or more distances between antenna elements).

In some aspects, the second indication to modify the activation state of the one or more antenna elements may include an indication to selectively modify one or more characteristics or components of the one or more antenna elements. For example, the second indication transmitted at 335 may include an indication for the first wireless device 305 to modify an LNA metric associated with the one or more antenna elements, a phase shifter metric associated with the one or more antenna elements (e.g., phase shifter phase and/or amplitude), a power level metric associated with the one or more antenna elements, or any combination thereof. For instance, the second indication transmitted at 335 may include an indication for the first wireless device 305 to deactivate the one or more antenna elements of the antenna array. In one example, the second wireless device 310 may determine to modify the tapering for the first wireless device 305, and the second indication to modify the activation state may include an indication (e.g., report) of which attenuations are to be used by the first wireless device 305 for which antenna elements. The indication may include mappings between attenuations and antenna elements, for example as attenuation-antenna element pairs.

At 340, the first wireless device 305 may identify the activation state of the one or more antenna elements of the antenna array of the first wireless device 305. In some aspects, the first wireless device 305 may identify the activation state of the one or more antenna elements based on receiving the second indication for the first wireless device 305 to modify the activation state of the one or more antenna elements at 335.

For example, upon receiving the second indication for the first wireless device 305 to modify the activation state of the one or more antenna elements at 335, the first wireless device 305 may identify (e.g., determine, modify, adjust) the activation state of the one or more antenna elements in accordance with (e.g., based on, in response to) the second indication. For instance, the first wireless device may determine (e.g., modify, adjust) an LNA metric associated with the one or more antenna elements, an phase shifter metric associated with the one or more antenna elements, a power level metric associated with the one or more antenna elements (e.g., active state, inactive state), or any combination thereof, based on the second indication.

At 345, the first wireless device 305 may communicate with the second wireless device 310 using the antenna array according to the identified activation state of the one or more antenna elements. In this regard, the first wireless device 305 and the second wireless device 310 may communicate with one another based on transmitting or receiving the first indication at 315, transmitting or receiving the request at 320, the positions of the first wireless device 305 and/or additional wireless devices determined at 325, the communications configurations associated with the first wireless device 305 and/or additional wireless devices determined at 330, transmitting or receiving the second indication at 335, identifying the activation state of the one or more antenna elements at 340, or any combination thereof. For example, the first wireless device 305 may receive transmissions (e.g., downlink transmissions) performed by the second wireless device 310 using the antenna array which includes antenna elements including activation states which were identified (e.g., modified, adjusted) based on the second indication received from the second wireless device 310.

In some aspects, the first wireless device 305 and the second wireless device 310 may additionally or alternatively identify (e.g., modify, adjust) activation states of antenna elements at the antenna array for performing transmissions (e.g., uplink transmissions) at the first wireless device 305. This may be further understood with reference to steps 350 through 370 of process flow 300.

At 350, the second wireless device 310 may transmit, to the first wireless device 305, an indication of a second activation state configured for performing transmissions at the first wireless device 305. In some aspects, the second activation state configured for performing transmissions at the first wireless device 305 may be the same or different from the activation state identified at 340. For example, the activation state identified at 340 may be configured for receiving transmissions at the first wireless device 305, and the second activation state received at 350 may be configured for performing transmissions at the first wireless device 305.

At 355, the first wireless device 305 may identify the second activation state configured for performing transmissions. In some aspects, the first wireless device 305 may identify the second activation state based on receiving the indication of the second activation state at 350. In some aspects, the first wireless device 305 may identify (e.g., modify, adjust) the activation state of the one or more antenna elements associated with the second activation state in accordance with (e.g., based on, in response to) the second activation state. For instance, the first wireless device may determine (e.g., modify, adjust) an LNA metric associated with the one or more antenna elements, an phase shifter metric associated with the one or more antenna elements, a power level metric associated with the one or more antenna elements (e.g., active state, inactive state), or any combination thereof, based on the indication of the second activation state received at 350.

At 360, the first wireless device 305 may transmit a reference signal (e.g., SRS) to the second wireless device according to the second activation state. In this regard, the first wireless device may transmit the reference signal at 360 based on receiving the indication of the second activation state at 350, identifying the second activation state at 355, or both.

At 365, the second wireless device 310 may transmit, to the first wireless device 305, a third indication based on (e.g., in response to) receiving the reference signal at 360. In some aspects, the third indication may include an instruction for the first wireless device 305 to modify the second activation state, an instruction for the first wireless device 305 to use the second activation state to perform transmissions, or both. For example, dependent on characteristics (e.g., RSSI, RSRP, RSRQ, SNR, SINR) of the reference signal received at 360 and transmitted according to the second activation state, the second wireless device 310 may determine whether the first wireless device 305 should use the second activation state to perform transmissions and/or modify the second activation state in order to perform the transmissions.

At 370, the first wireless device 305 may communicate with the second wireless device 310 using the antenna array according to the third indication received at 365. In this regard, the first wireless device 305 and the second wireless device 310 may communicate with one another based on transmitting or receiving the indication of the second activation state at 350, identifying the second activation state at 355, transmitting or receiving the reference signal at 360, transmitting or receiving the third indication at 365, or any combination thereof. For example, the first wireless device 305 may transmit a signal to the second wireless device in accordance with the third indication to modify the second activation state, to use the second activation state to perform transmissions, or both.

Techniques described herein may enable wireless devices (e.g., second wireless device 310) to selectively modify activation states of antenna elements of other wireless devices (e.g., first wireless device 305) based on the structure of antenna elements and network characteristics. By enabling for the selective modification of activation states associated with antenna elements based on the structure of an antenna array as well as network characteristics, techniques described herein may provide for reduced power consumption of the antenna arrays while also reducing or eliminating interference which may result from other power saving techniques.

Figure 4:
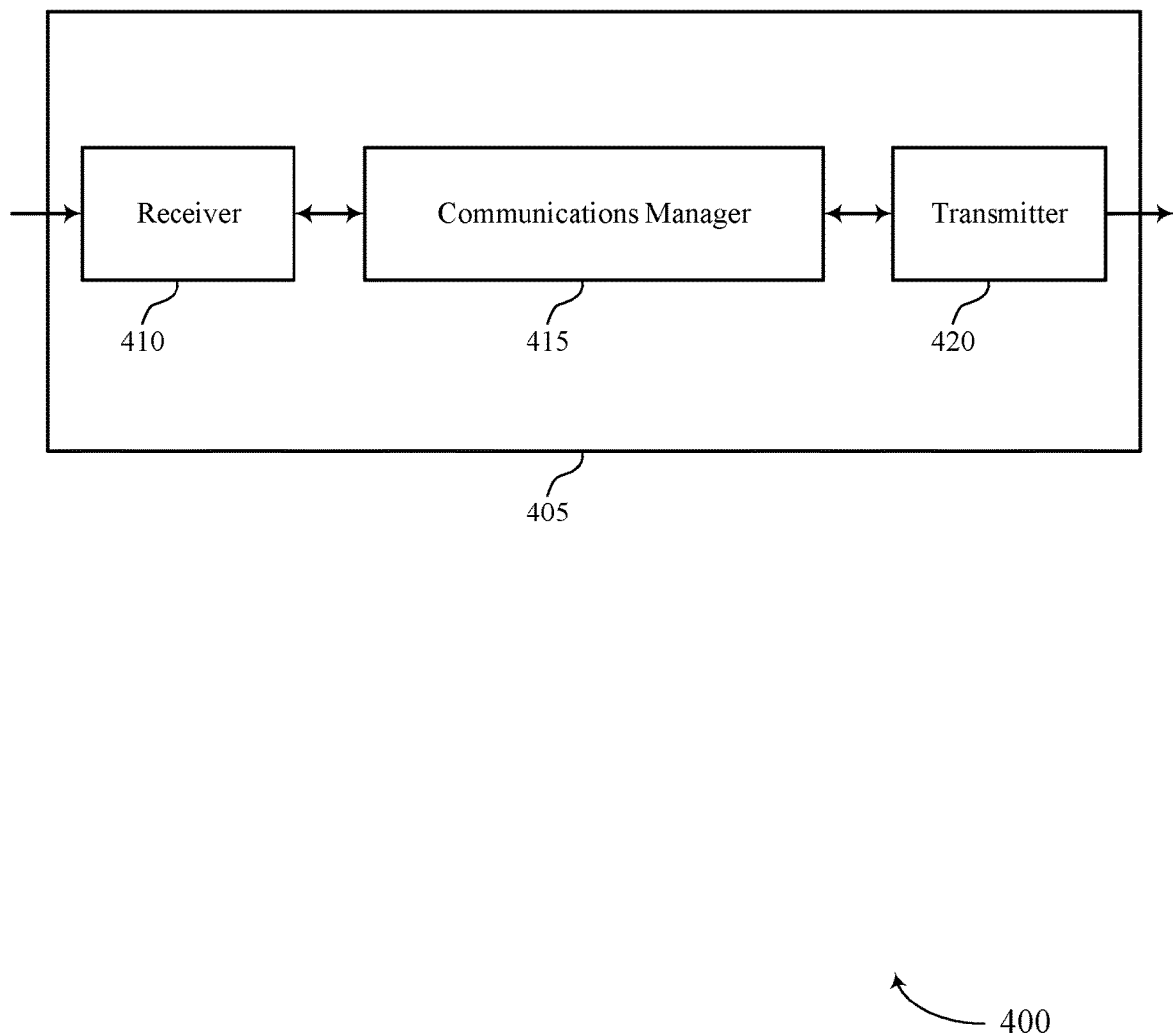
FIGS. 4 and 5 show block diagrams of devices that support base station reports of UE antenna selection in accordance with aspects of the present disclosure.

FIG. 4 shows a block diagram 400 of a device 405 that supports base station reports of UE antenna selection in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to base station reports of UE antenna selection, etc.). Information may be passed on to other components of the device 405. The receiver 410 may be an example of aspects of the transceiver 720 described with reference to FIG. 7. The receiver 410 may utilize a single antenna or a set of antennas.

In the context of a first wireless device (e.g., UE, first IAB node) which is to determine (e.g., modify, adjust) activation states of antenna elements based on signaling received from a second wireless device (e.g., base station, second IAB node), the communications manager 415 may transmit, to a second wireless device, a first indication of a capability to selectively configure activation states for a set of antenna elements of an antenna array of the first wireless device, and of one or more parameter values that indicate a structure of the antenna array, receive, from the second wireless device in response to the transmitted first indication, a second indication for the first wireless device to modify an activation state of one or more antenna elements of the set of antenna elements, identify the activation state of the one or more antenna elements based on the received second indication, and communicate with the second wireless device using the antenna array according to the identified activation state of the one or more antenna elements.

In the context of a second wireless device (e.g., base station, second IAB node) which is to instruct a first wireless device (e.g., UE, first IAB node) to modify activation states of antenna elements, the communications manager 415 may receive, from a first wireless device, a first indication of a capability to selectively configure activation states for a set of antenna elements of an antenna array of the first wireless device, and of one or more parameter values that indicate a structure of the antenna array and transmit, to the first wireless device in response to the received first indication, a second indication for the first wireless device to modify an activation state of one or more antenna elements of the set of antenna elements of the antenna array. The communications manager 415 may be an example of aspects of the communications manager 710 described herein.

The actions performed by the communications manager 415 as described herein may be implemented to realize one or more potential advantages. For example, techniques described herein may enable wireless devices (e.g., base stations 105, IAB nodes) to selectively modify activation states of antenna elements of other wireless devices (e.g., UEs 115, IAB nodes) based on the structure of antenna elements and network characteristics. By enabling for the selective modification of activation states associated with antenna elements based on the structure of an antenna array as well as network characteristics, techniques described herein may provide for reduced power consumption of the antenna arrays at UEs 115 while also reducing or eliminating interference which may result from other power saving techniques.

By enabling for selective modification of activation states of antenna elements, a processor of the UE 115 (e.g., a processor controlling the receiver 410, the communications manager 415, the transmitter 420, etc.) may reduce processing resources used for wireless communications. For example, by deactivating one or more antenna elements based on indications received from another wireless device, processing used to operate an antenna array at a UE 115 may be reduced. Moreover, by selectively adjusting activation states of antenna elements based on parameters of the antenna array and network characteristics, interference attributable to grating lobes (e.g., grating lobes 215 illustrated in FIG. 2) may be reduced, thereby reducing a number of times the processor ramps up processing power and turns on processing units to receive and perform transmissions.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
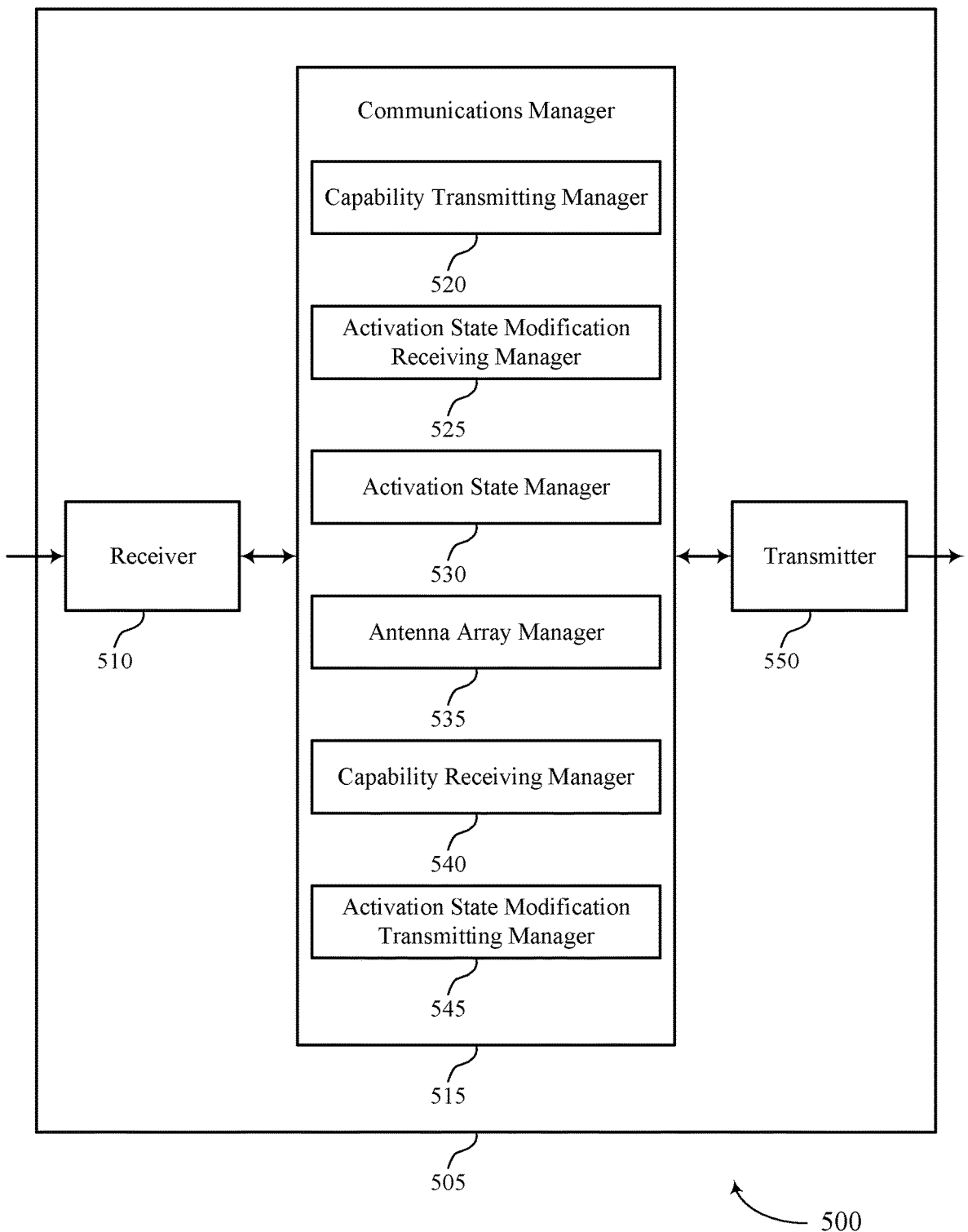

FIG. 5 shows a block diagram 500 of a device 505 that supports base station reports of UE antenna selection in accordance with aspects of the present disclosure. The device 505 may be an example of aspects of a device 405, or a UE 115 as described herein. The device 505 may include a receiver 510, a communications manager 515, and a transmitter 550. The device 505 may also include a processor. Each of these components may be in communication with one another (e.g., via one or more buses).

The receiver 510 may receive information such as packets, user data, or control information associated with various information channels (e.g., control channels, data channels, and information related to base station reports of UE antenna selection, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a capability transmitting manager 520, an activation state modification receiving manager 525, an activation state manager 530, an antenna array manager 535, a capability receiving manager 540, and an activation state modification transmitting manager 545. The communications manager 515 may be an example of aspects of the communications manager 710 described herein.

The capability transmitting manager 520 may transmit, to a second wireless device, a first indication of a capability to selectively configure activation states for a set of antenna elements of an antenna array of the first wireless device, and of one or more parameter values that indicate a structure of the antenna array.

The activation state modification receiving manager 525 may receive, from the second wireless device in response to the transmitted first indication, a second indication for the first wireless device to modify an activation state of one or more antenna elements of the set of antenna elements.

The activation state manager 530 may identify the activation state of the one or more antenna elements based on the received second indication.

The antenna array manager 535 may communicate with the second wireless device using the antenna array according to the identified activation state of the one or more antenna elements.

The capability receiving manager 540 may receive, from a first wireless device, a first indication of a capability to selectively configure activation states for a set of antenna elements of an antenna array of the first wireless device, and of one or more parameter values that indicate a structure of the antenna array.

The activation state modification transmitting manager 545 may transmit, to the first wireless device in response to the received first indication, a second indication for the first wireless device to modify an activation state of one or more antenna elements of the set of antenna elements of the antenna array.

The transmitter 550 may transmit signals generated by other components of the device 505. In some examples, the transmitter 550 may be collocated with a receiver 510 in a transceiver module. For example, the transmitter 550 may be an example of aspects of the transceiver 720 described with reference to FIG. 7. The transmitter 550 may utilize a single antenna or a set of antennas.

Figure 6:
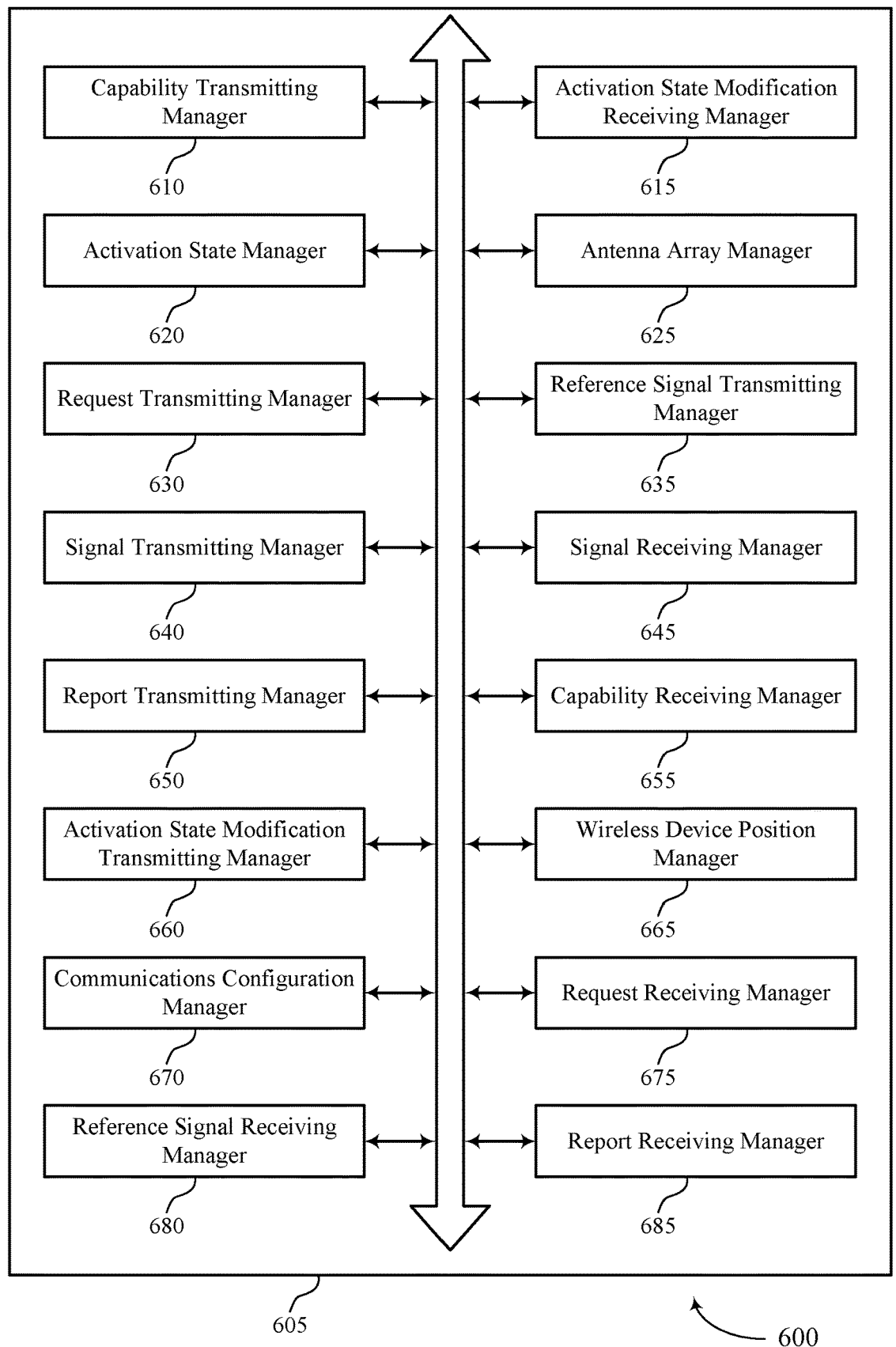
FIG. 6 shows a block diagram of a communications manager that supports base station reports of UE antenna selection in accordance with aspects of the present disclosure.

FIG. 6 shows a block diagram 600 of a communications manager 605 that supports base station reports of UE antenna selection in accordance with aspects of the present disclosure. The communications manager 605 may be an example of aspects of a communications manager 415, a communications manager 515, or a communications manager 710 described herein. The communications manager 605 may include a capability transmitting manager 610, an activation state modification receiving manager 615, an activation state manager 620, an antenna array manager 625, a request transmitting manager 630, a reference signal transmitting manager 635, a signal transmitting manager 640, a signal receiving manager 645, a report transmitting manager 650, a capability receiving manager 655, an activation state modification transmitting manager 660, a wireless device position manager 665, a communications configuration manager 670, a request receiving manager 675, a reference signal receiving manager 680, and a report receiving manager 685. Each of these modules may communicate, directly or indirectly, with one another (e.g., via one or more buses).

The capability transmitting manager 610 may transmit, to a second wireless device, a first indication of a capability to selectively configure activation states for a set of antenna elements of an antenna array of the first wireless device, and of one or more parameter values that indicate a structure of the antenna array. In some cases, the first indication is transmitted via an RRC message, a MAC-CE message, a UCI message, a CSI report message, or any combination thereof.

In some examples, the capability transmitting manager 610 may transmit one or more of a first parameter value indicating an arrangement of antenna elements within the antenna array, a second parameter value indicating a quantity of antenna elements within the antenna array, a third parameter value indicating a size of the antenna array, or a fourth parameter value indicating one or more distances between antenna elements of the antenna array, where receiving the second indication is based on the one or more of the first parameter value, the second parameter value, the third parameter value, or the fourth parameter value. In some cases, the first parameter value indicating the arrangement of antenna elements within the antenna array includes an indication of a ULA, a URA, a UCA, or any combination thereof.

In some examples, the capability transmitting manager 610 may transmit, to the second wireless device, an indication that an activation state of a subset of antenna elements of the set of antenna elements is incapable of being modified, where receiving the second indication is based on transmitting the indication that the activation state of the subset of antenna elements is incapable of being modified.

In some cases, the first wireless device includes a UE, a first integrated access and backhaul node, or both, and where the second wireless device includes a base station, a second integrated access and backhaul node, or both.

The activation state modification receiving manager 615 may receive, from the second wireless device in response to the transmitted first indication, a second indication for the first wireless device to modify an activation state of one or more antenna elements of the set of antenna elements. In some examples, the activation state modification receiving manager 615 may receive an indication to modify an LNA metric associated with the one or more antenna elements, a phase shifter metric associated with the one or more antenna elements, a power level metric associated with the one or more antenna elements, or any combination thereof. In some examples, the activation state modification receiving manager 615 may receive an indication to deactivate the one or more antenna elements.

In some examples, the activation state modification receiving manager 615 may receive, from the second wireless device based on transmitting the reference signal, a third indication to modify the second activation state, to use the second activation state to perform transmissions, or both. In some examples, the activation state modification receiving manager 615 may receive, from the second wireless device, an indication of the second activation state configured for performing transmissions, where transmitting the reference signal according to the second activation state is based on receiving the indication of the second activation state.

In some cases, the second indication is received via an RRC message, a MAC-CE message, a DCI message, a feedback message responsive to a CSI report message, or any combination thereof.

The activation state manager 620 may identify the activation state of the one or more antenna elements based on the received second indication. In some examples, the activation state manager 620 may identify a second activation state for the set of antenna elements of the antenna array, the second activation state configured for performing transmissions.

The antenna array manager 625 may communicate with the second wireless device using the antenna array according to the identified activation state of the one or more antenna elements. In some examples, the antenna array manager 625 may communicate with the first wireless device based on the transmitted second indication to adjust the activation state of the one or more antenna elements.

The capability receiving manager 655 may receive, from a first wireless device, a first indication of a capability to selectively configure activation states for a set of antenna elements of an antenna array of the first wireless device, and of one or more parameter values that indicate a structure of the antenna array. In some examples, the capability receiving manager 655 may receive one or more of a first parameter value indicating an arrangement of antenna elements within the antenna array, a second parameter value indicating a quantity of antenna elements within the antenna array, a third parameter value indicating a size of the antenna array, or a fourth parameter value indicating one or more distances between antenna elements of the antenna array, where transmitting the second indication is based on the one or more of the first parameter value, the second parameter value, the third parameter value, or the fourth parameter value. In some cases, the first parameter value indicating the arrangement of antenna elements within the antenna array includes an indication of a ULA, a URA, a UCA, or any combination thereof.

In some examples, the capability receiving manager 655 may receive, from the first wireless device, an indication that an activation state of a subset of antenna elements of the set of antenna elements is incapable of being modified, where transmitting the second indication is based on receiving the indication that the activation state of the subset of antenna elements is incapable of being modified.

The activation state modification transmitting manager 660 may transmit, to the first wireless device in response to the received first indication, a second indication for the first wireless device to modify an activation state of one or more antenna elements of the set of antenna elements of the antenna array. In some examples, the activation state modification transmitting manager 660 may transmit an indication to modify an LNA metric associated with the one or more antenna elements, a phase shifter metric associated with the one or more antenna elements, a power level metric associated with the one or more antenna elements, or any combination thereof. In some examples, the activation state modification transmitting manager 660 may transmit an indication to deactivate the one or more antenna elements.

In some examples, the activation state modification transmitting manager 660 may transmit, to the first wireless device, an indication of a second activation state for the set of antenna elements of the antenna array, the second activation state configured for performing transmissions at the first wireless device. In some examples, the activation state modification transmitting manager 660 may transmit, to the first wireless device in response to receiving the reference signal, a third indication to modify the second activation state, to use the second activation state to perform transmissions, or both.

The request transmitting manager 630 may transmit, to the second wireless device, a request for the second wireless device to configure the activation state of the one or more antenna elements, where the second indication is received based on transmitting the request. In some cases, the request indicates a quantity of antenna elements associated with the request, that the request is associated with the one or more antenna elements, or both.

The reference signal transmitting manager 635 may transmit a reference signal to the second wireless device according to the second activation state.

The signal transmitting manager 640 may transmit a signal to the second wireless device in accordance with the third indication to modify the second activation state, to use the second activation state to perform transmissions, or both.

The signal receiving manager 645 may identify signals transmitted by a third wireless device. In some examples, the signal receiving manager 645 may receive a signal from the first wireless device in accordance with the third indication to modify the second activation state, to use the second activation state to perform transmissions, or both.

The report transmitting manager 650 may transmit, to the second wireless device, a report including an indication of the signals transmitted by the third wireless device, where receiving the second indication to modify the activation state of the one or more antenna elements of the set of antenna elements of the antenna array is based on transmitting the report.

The wireless device position manager 665 may determine a position of the first wireless device, a position of a third wireless device, or both, where transmitting the second indication is based on the determined position of the first wireless device, the determined position of the third wireless device, or both.

The communications configuration manager 670 may determine a first communications configuration for wireless communications at the first wireless device, a second communications configuration for wireless communications at a third wireless device, or both, where transmitting the second indication is based on the determined first communications configuration, the determined second communications configuration, or both.

The request receiving manager 675 may receive, from the first wireless device, a request for the second wireless device to configure the activation state of the one or more antenna elements, where the second indication is transmitted based on receiving the request. In some cases, the request includes an indication of a quantity of antenna elements associated with the request, an indication that the request is associated with the one or more antenna elements, or both.

The reference signal receiving manager 680 may receive a reference signal from the first wireless device based on transmitting the indication of the second activation state.

The report receiving manager 685 may receive, from the first wireless device, a report including an indication of signals received by the first wireless device which were transmitted by a third wireless device, where transmitting the second indication to modify the activation state of the one or more antenna elements of the set of antenna elements of the antenna array is based on receiving the report.

Figure 7:
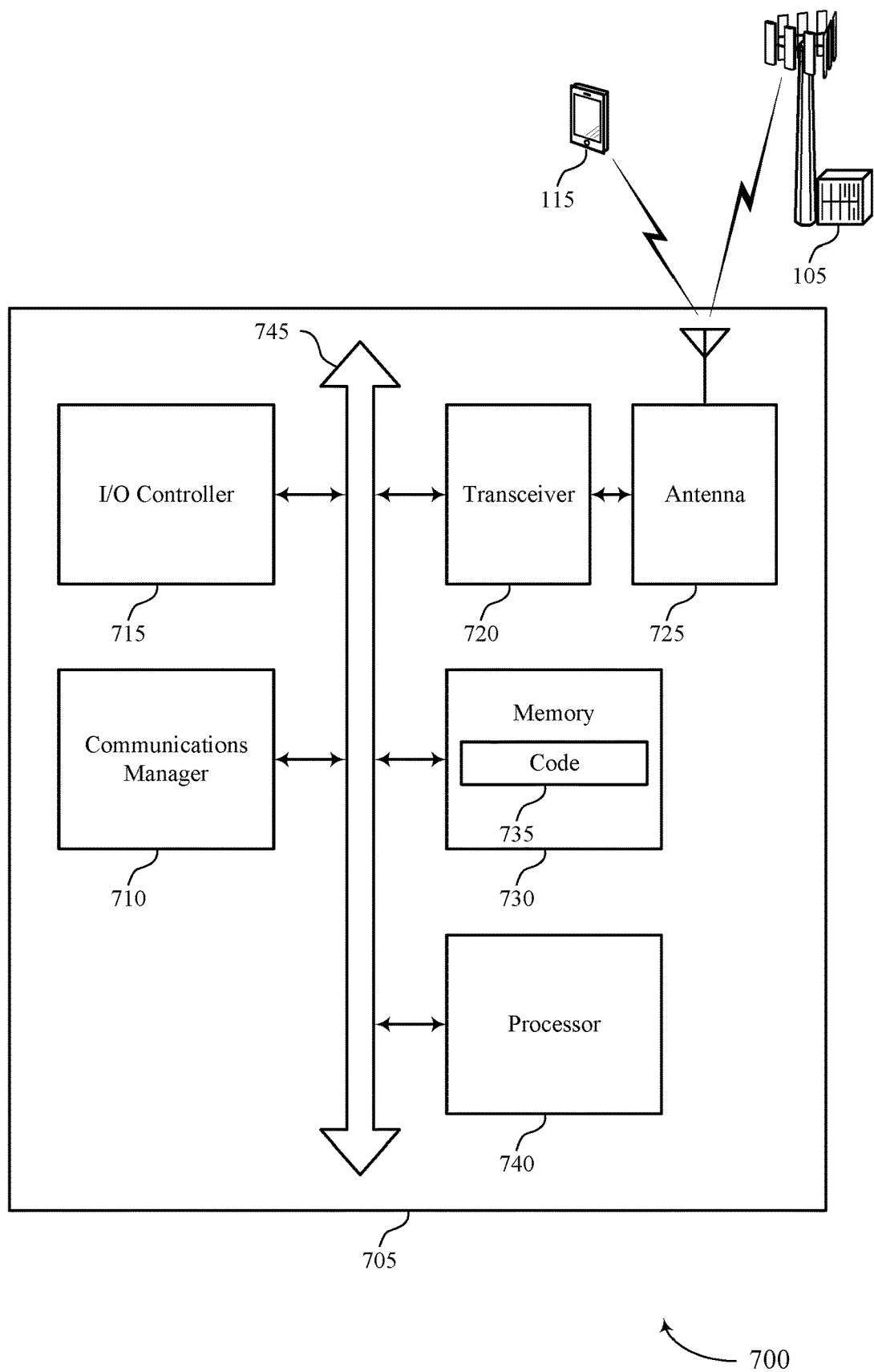
FIG. 7 shows a diagram of a system including a device that supports base station reports of UE antenna selection in accordance with aspects of the present disclosure.

FIG. 7 shows a diagram of a system 700 including a device 705 that supports base station reports of UE antenna selection in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may transmit, to a second wireless device, a first indication of a capability to selectively configure activation states for a set of antenna elements of an antenna array of the first wireless device, and of one or more parameter values that indicate a structure of the antenna array, receive, from the second wireless device in response to the transmitted first indication, a second indication for the first wireless device to modify an activation state of one or more antenna elements of the set of antenna elements, identify the activation state of the one or more antenna elements based on the received second indication, and communicate with the second wireless device using the antenna array according to the identified activation state of the one or more antenna elements. The communications manager 710 may also receive, from a first wireless device, a first indication of a capability to selectively configure activation states for a set of antenna elements of an antenna array of the first wireless device, and of one or more parameter values that indicate a structure of the antenna array and transmit, to the first wireless device in response to the received first indication, a second indication for the first wireless device to modify an activation state of one or more antenna elements of the set of antenna elements of the antenna array.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting base station reports of UE antenna selection).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
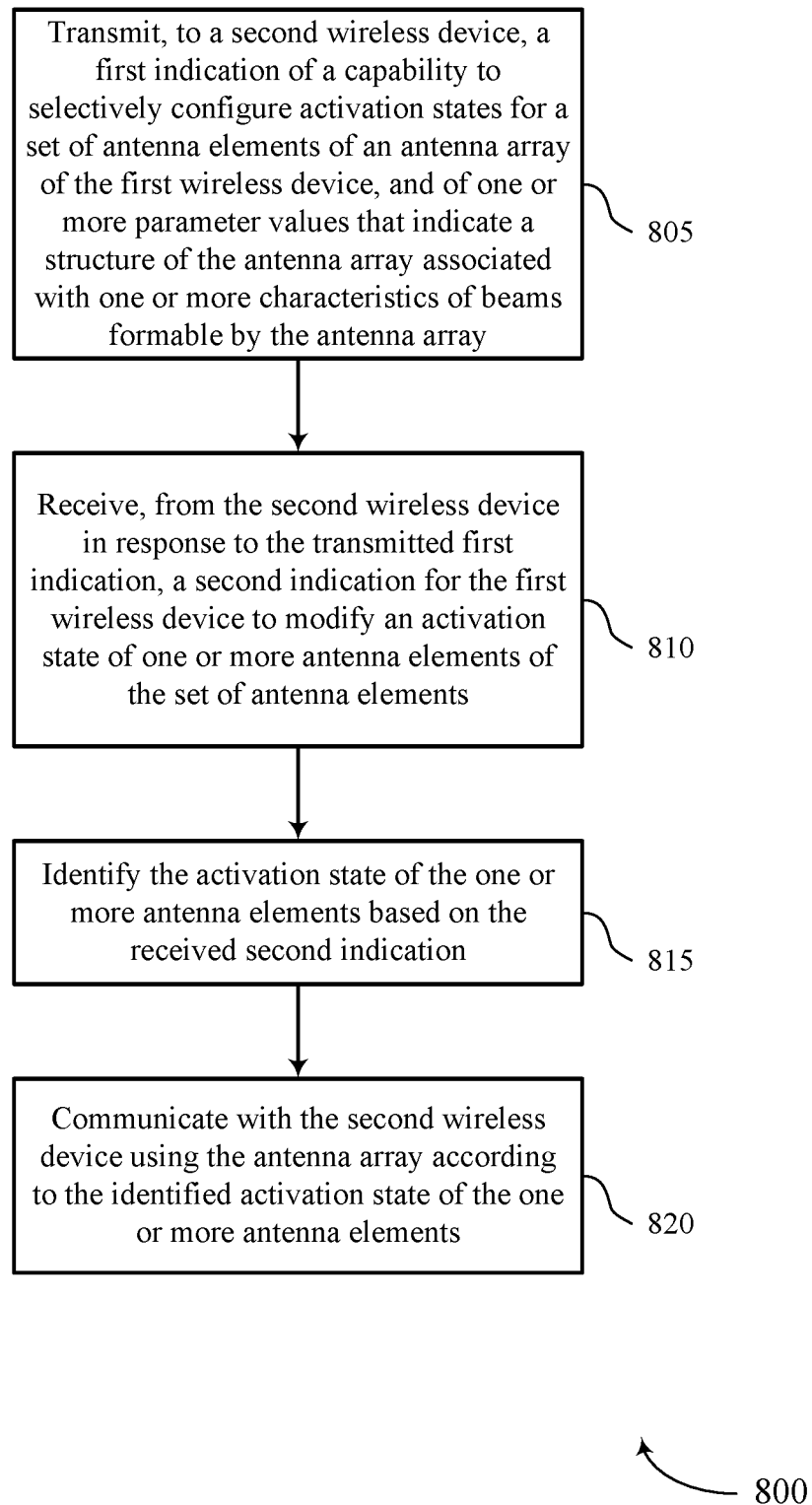
FIGS. 8 through 11 show flowcharts illustrating methods that support base station reports of UE antenna selection in accordance with aspects of the present disclosure.

FIG. 8 shows a flowchart illustrating a method 800 that supports base station reports of UE antenna selection in accordance with aspects of the present disclosure. The operations of method 800 may be implemented by a UE 115 or its components as described herein. For example, the operations of method 800 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 805, the UE may transmit, to a second wireless device, a first indication of a capability to selectively configure activation states for a set of antenna elements of an antenna array of the first wireless device, and of one or more parameter values that indicate a structure of the antenna array associated with one or more characteristics of beams formable by the antenna array. The operations of 805 may be performed according to the methods described herein. In some examples, aspects of the operations of 805 may be performed by a capability transmitting manager as described with reference to FIGS. 4 through 7.

At 810, the UE may receive, from the second wireless device in response to the transmitted first indication, a second indication for the first wireless device to modify an activation state of one or more antenna elements of the set of antenna elements. The operations of 810 may be performed according to the methods described herein. In some examples, aspects of the operations of 810 may be performed by an activation state modification receiving manager as described with reference to FIGS. 4 through 7.

At 815, the UE may identify the activation state of the one or more antenna elements based on the received second indication. The operations of 815 may be performed according to the methods described herein. In some examples, aspects of the operations of 815 may be performed by an activation state manager as described with reference to FIGS. 4 through 7.

At 820, the UE may communicate with the second wireless device using the antenna array according to the identified activation state of the one or more antenna elements. The operations of 820 may be performed according to the methods described herein. In some examples, aspects of the operations of 820 may be performed by an antenna array manager as described with reference to FIGS. 4 through 7.

Figure 9:
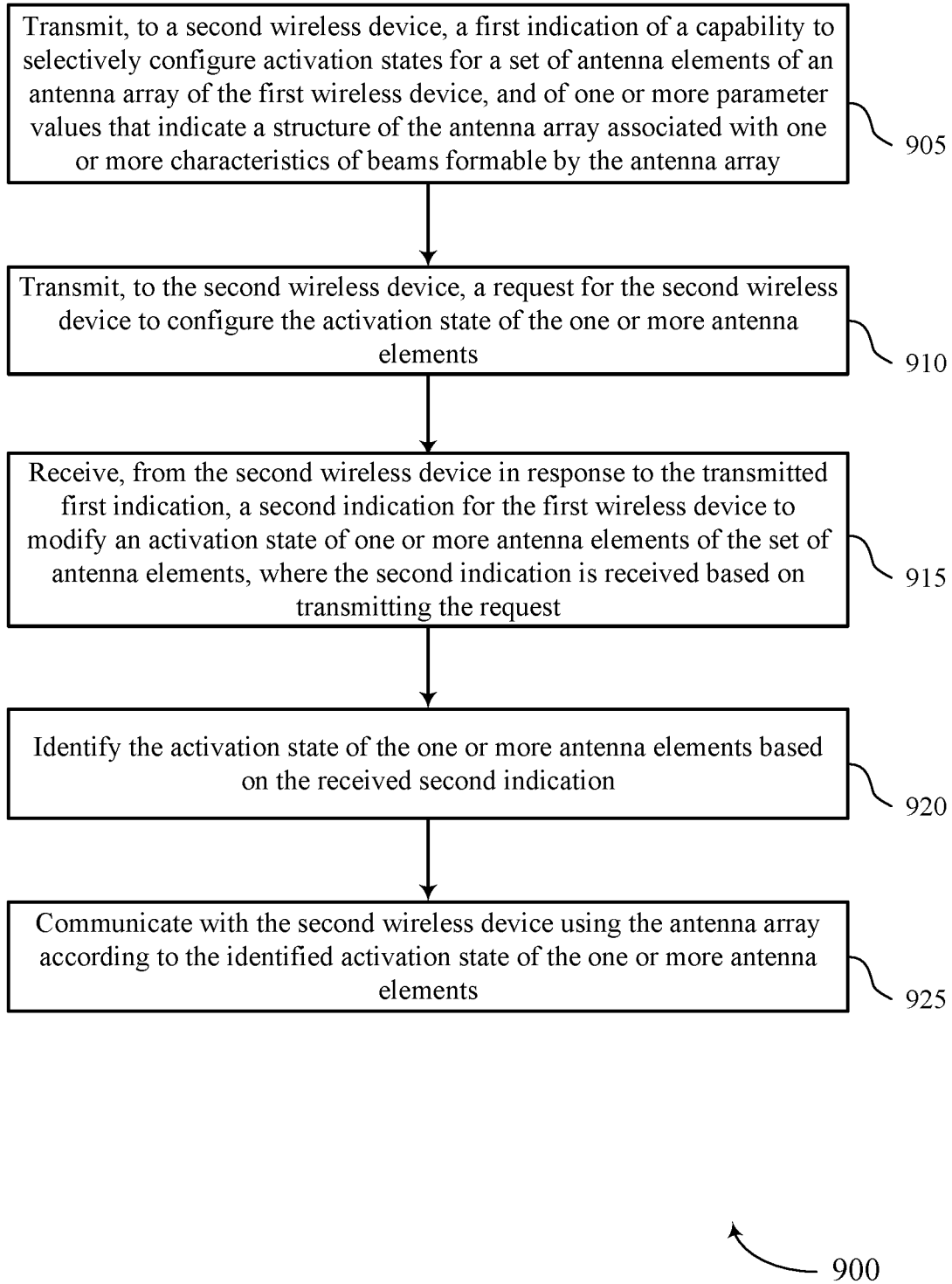

FIG. 9 shows a flowchart illustrating a method 900 that supports base station reports of UE antenna selection in accordance with aspects of the present disclosure. The operations of method 900 may be implemented by a UE 115 or its components as described herein. For example, the operations of method 900 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 905, the UE may transmit, to a second wireless device, a first indication of a capability to selectively configure activation states for a set of antenna elements of an antenna array of the first wireless device, and of one or more parameter values that indicate a structure of the antenna array associated with one or more characteristics of beams formable by the antenna array. The operations of 905 may be performed according to the methods described herein. In some examples, aspects of the operations of 905 may be performed by a capability transmitting manager as described with reference to FIGS. 4 through 7.

At 910, the UE may transmit, to the second wireless device, a request for the second wireless device to configure the activation state of the one or more antenna elements. The operations of 910 may be performed according to the methods described herein. In some examples, aspects of the operations of 910 may be performed by a request transmitting manager as described with reference to FIGS. 4 through 7.

At 915, the UE may receive, from the second wireless device in response to the transmitted first indication, a second indication for the first wireless device to modify an activation state of one or more antenna elements of the set of antenna elements, where the second indication is received based on transmitting the request. The operations of 915 may be performed according to the methods described herein. In some examples, aspects of the operations of 915 may be performed by an activation state modification receiving manager as described with reference to FIGS. 4 through 7.

At 920, the UE may identify the activation state of the one or more antenna elements based on the received second indication. The operations of 920 may be performed according to the methods described herein. In some examples, aspects of the operations of 920 may be performed by an activation state manager as described with reference to FIGS. 4 through 7.

At 925, the UE may communicate with the second wireless device using the antenna array according to the identified activation state of the one or more antenna elements. The operations of 925 may be performed according to the methods described herein. In some examples, aspects of the operations of 925 may be performed by an antenna array manager as described with reference to FIGS. 4 through 7.

Figure 10:
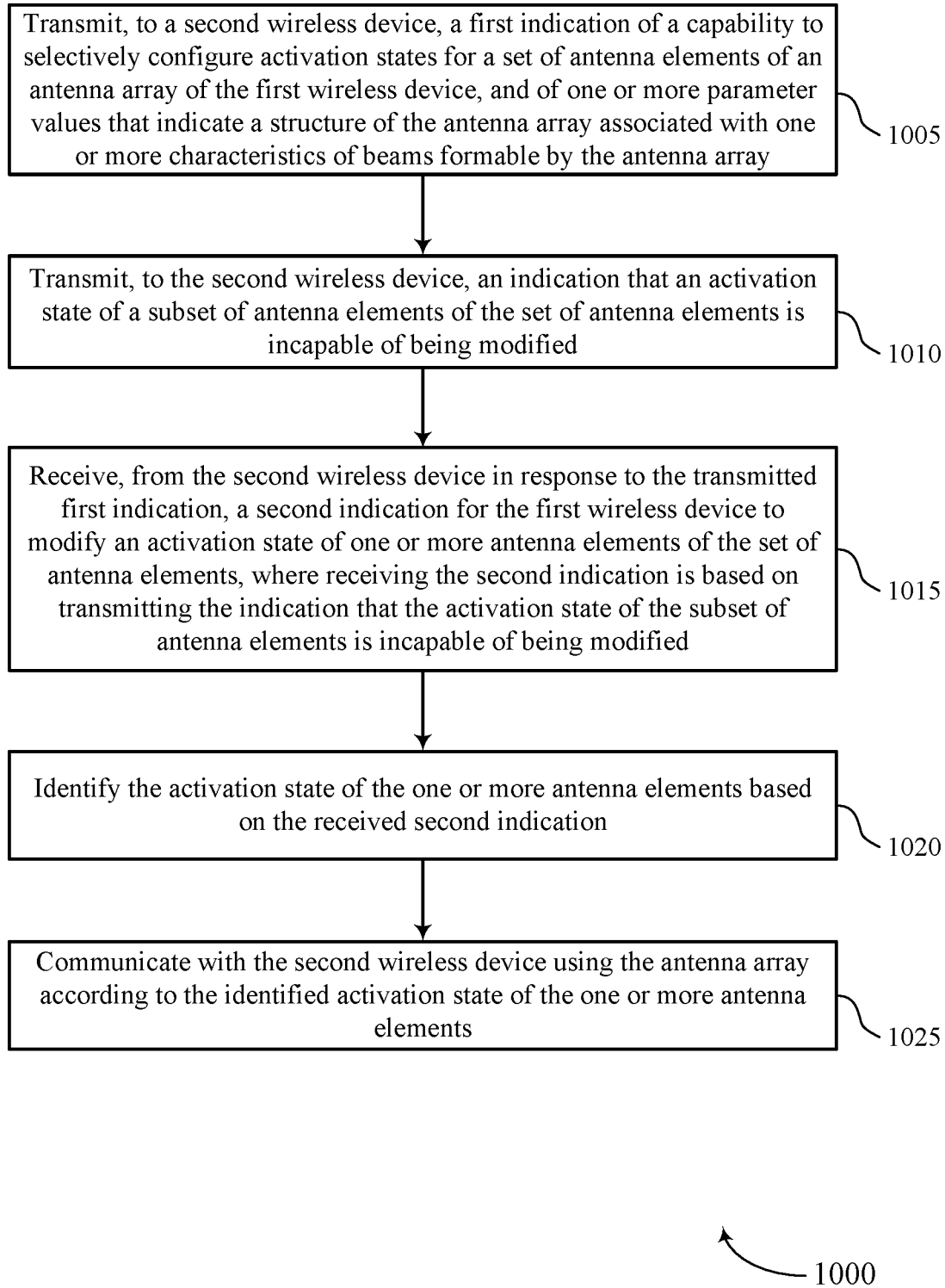

FIG. 10 shows a flowchart illustrating a method 1000 that supports base station reports of UE antenna selection in accordance with aspects of the present disclosure. The operations of method 1000 may be implemented by a UE 115 or its components as described herein. For example, the operations of method 1000 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1005, the UE may transmit, to a second wireless device, a first indication of a capability to selectively configure activation states for a set of antenna elements of an antenna array of the first wireless device, and of one or more parameter values that indicate a structure of the antenna array associated with one or more characteristics of beams formable by the antenna array. The operations of 1005 may be performed according to the methods described herein. In some examples, aspects of the operations of 1005 may be performed by a capability transmitting manager as described with reference to FIGS. 4 through 7.

At 1010, the UE may transmit, to the second wireless device, an indication that an activation state of a subset of antenna elements of the set of antenna elements is incapable of being modified. The operations of 1010 may be performed according to the methods described herein. In some examples, aspects of the operations of 1010 may be performed by a capability transmitting manager as described with reference to FIGS. 4 through 7.

At 1015, the UE may receive, from the second wireless device in response to the transmitted first indication, a second indication for the first wireless device to modify an activation state of one or more antenna elements of the set of antenna elements, where receiving the second indication is based on transmitting the indication that the activation state of the subset of antenna elements is incapable of being modified. The operations of 1015 may be performed according to the methods described herein. In some examples, aspects of the operations of 1015 may be performed by an activation state modification receiving manager as described with reference to FIGS. 4 through 7.

At 1020, the UE may identify the activation state of the one or more antenna elements based on the received second indication. The operations of 1020 may be performed according to the methods described herein. In some examples, aspects of the operations of 1020 may be performed by an activation state manager as described with reference to FIGS. 4 through 7.

At 1025, the UE may communicate with the second wireless device using the antenna array according to the identified activation state of the one or more antenna elements. The operations of 1025 may be performed according to the methods described herein. In some examples, aspects of the operations of 1025 may be performed by an antenna array manager as described with reference to FIGS. 4 through 7.

Figure 11:
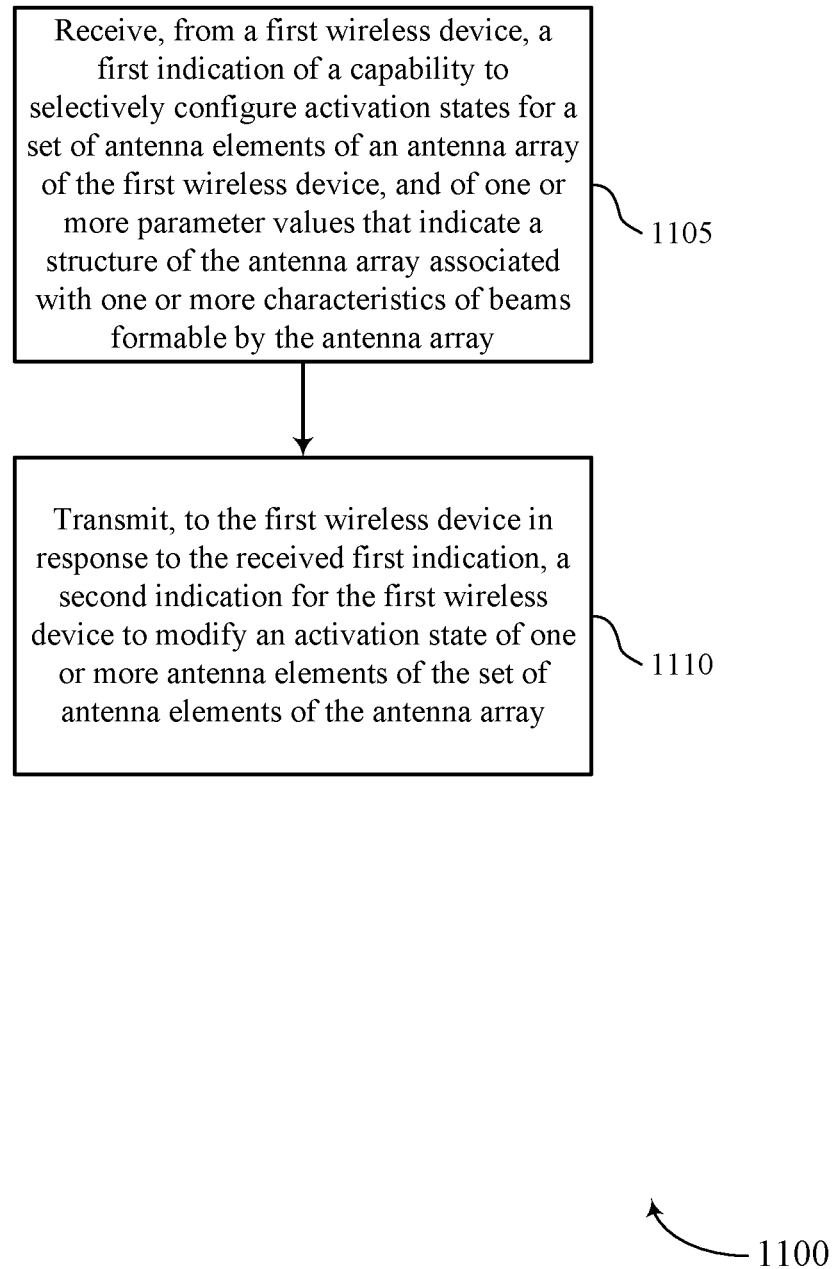

FIG. 11 shows a flowchart illustrating a method 1100 that supports base station reports of UE antenna selection in accordance with aspects of the present disclosure. The operations of method 1100 may be implemented by a UE 115 or its components as described herein. For example, the operations of method 1100 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1105, the UE may receive, from a first wireless device, a first indication of a capability to selectively configure activation states for a set of antenna elements of an antenna array of the first wireless device, and of one or more parameter values that indicate a structure of the antenna array associated with one or more characteristics of beams formable by the antenna array. The operations of 1105 may be performed according to the methods described herein. In some examples, aspects of the operations of 1105 may be performed by a capability receiving manager as described with reference to FIGS. 4 through 7.

At 1110, the UE may transmit, to the first wireless device in response to the received first indication, a second indication for the first wireless device to modify an activation state of one or more antenna elements of the set of antenna elements of the antenna array. The operations of 1110 may be performed according to the methods described herein. In some examples, aspects of the operations of 1110 may be performed by an activation state modification transmitting manager as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a first wireless device, comprising: transmitting, to a second wireless device, a first indication of a capability to selectively configure activation states for a plurality of antenna elements of an antenna array of the first wireless device, and of one or more parameter values that indicate a structure of the antenna array associated with one or more characteristics of beams formable by the antenna array; receiving, from the second wireless device in response to the transmitted first indication, a second indication for the first wireless device to modify an activation state of one or more antenna elements of the plurality of antenna elements; identifying the activation state of the one or more antenna elements based at least in part on the received second indication; and communicating with the second wireless device using the antenna array according to the identified activation state of the one or more antenna elements.

Aspect 2: The method of aspect 1, further comprising: transmitting, to the second wireless device, a request for the second wireless device to configure the activation state of the one or more antenna elements, wherein the second indication is received based at least in part on transmitting the request.

Aspect 3: The method of aspect 2, wherein the request indicates a quantity of antenna elements associated with the request, that the request is associated with the one or more antenna elements, or both.

Aspect 4: The method of claim 1, wherein transmitting the first indication of the one or more parameter values that indicate the structure of the antenna array comprises: transmitting a first parameter value indicating an arrangement of antenna elements within the antenna array, a second parameter value indicating a quantity of antenna elements within the antenna array, or both, wherein receiving the second indication is based at least in part on the first parameter value, the second parameter value, or both.

Aspect 5: The method of aspect 4, wherein the first parameter value indicating the arrangement of antenna elements within the antenna array comprises an indication of a ULA, a URA, a UCA, or any combination thereof.

Aspect 6: The method of any of aspects 1 through 5, wherein transmitting the first indication of the one or more parameter values that indicate the structure of the antenna array comprises: transmitting a first parameter value associated with supported phases or amplitudes of one or more phase shifters of the antenna array, a second parameter value indicating a size of the antenna array, a third parameter value indicating one or more distances between antenna elements of the antenna array, or any combination thereof, wherein receiving the second indication is based at least in part on the first parameter value, the second parameter value, the third parameter value, or any combination thereof.

Aspect 7: The method of any of aspects 1 through 6, further comprising: transmitting, to the second wireless device, an indication that an activation state of a subset of antenna elements of the plurality of antenna elements is incapable of being modified, wherein receiving the second indication is based at least in part on transmitting the indication that the activation state of the subset of antenna elements is incapable of being modified.

Aspect 8: The method of any of aspects 1 through 7, wherein receiving the second indication to modify the activation state of the one or more antenna elements comprises: receiving an indication to modify an LNA metric associated with the one or more antenna elements, a phase shifter metric associated with the one or more antenna elements, a power level metric associated with the one or more antenna elements, or any combination thereof.

Aspect 9: The method of any of aspects 1 through 8, wherein receiving the second indication to modify the activation state of the one or more antenna elements comprises: receiving an indication to deactivate the one or more antenna elements.

Aspect 10: The method of any of aspects 1 through 9, wherein the first indication is transmitted via a radio resource control message, a MAC-CE message, a UCI message, a CSI report message, or any combination thereof.

Aspect 11: The method of any of aspects 1 through 10, wherein the second indication is received via a radio resource control message, a MAC-CE message, a DCI message, a feedback message responsive to a CSI report message, or any combination thereof.

Aspect 12: The method of any of aspects 1 through 11, further comprising: identifying a second activation state for the plurality of antenna elements of the antenna array, the second activation state configured for performing transmissions; transmitting a reference signal to the second wireless device according to the second activation state; and receiving, from the second wireless device based at least in part on transmitting the reference signal, a third indication to modify the second activation state, to use the second activation state to perform transmissions, or both.

Aspect 13: The method of aspect 12, further comprising: transmitting a signal to the second wireless device in accordance with the third indication to modify the second activation state, to use the second activation state to perform transmissions, or both.

Aspect 14: The method of any of aspects 12 through 13, further comprising: receiving, from the second wireless device, an indication of the second activation state configured for performing transmissions, wherein transmitting the reference signal according to the second activation state is based at least in part on receiving the indication of the second activation state.

Aspect 15: The method of any of aspects 1 through 14, further comprising: identifying signals transmitted by a third wireless device; and transmitting, to the second wireless device, a report comprising an indication of the signals transmitted by the third wireless device, wherein receiving the second indication to modify the activation state of the one or more antenna elements of the plurality of antenna elements of the antenna array is based at least in part on transmitting the report.

Aspect 16: The method of any of aspects 1 through 15, wherein the first wireless device comprises a UE, a first IAB node, or both, and the second wireless device comprises a base station, a second IAB node, or both.

Aspect 17: The method of any of aspects 1 through 16, wherein the one or more characteristics of beams formable by the antenna array comprises an orientation of primary beams, an orientation of unintended grating lobes, a size or shape of primary beams, a size or shape of unintended lobes, or any combination thereof.

Aspect 18: A method of wireless communication at a second wireless device, comprising: receiving, from a first wireless device, a first indication of a capability to selectively configure activation states for a plurality of antenna elements of an antenna array of the first wireless device, and of one or more parameter values that indicate a structure of the antenna array associated with one or more characteristics of beams formable by the antenna array; and transmitting, to the first wireless device in response to the received first indication, a second indication for the first wireless device to modify an activation state of one or more antenna elements of the plurality of antenna elements of the antenna array.

Aspect 19: The method of aspect 18, further comprising: determining a position of the first wireless device, a position of a third wireless device, or both, wherein transmitting the second indication is based at least in part on the determined position of the first wireless device, the determined position of the third wireless device, or both.

Aspect 20: The method of any of aspects 18 through 19, further comprising: determining a first communications configuration for wireless communications at the first wireless device, a second communications configuration for wireless communications at a third wireless device, or both, wherein transmitting the second indication is based at least in part on the determined first communications configuration, the determined second communications configuration, or both.

Aspect 21: The method of any of aspects 18 through 20, further comprising: communicating with the first wireless device based at least in part on the transmitted second indication to adjust the activation state of the one or more antenna elements.

Aspect 22: The method of any of aspects 18 through 21, further comprising: receiving, from the first wireless device, a request for the second wireless device to configure the activation state of the one or more antenna elements, wherein the second indication is transmitted based at least in part on receiving the request.

Aspect 23: The method of any of aspects 18 through 22, wherein receiving the first indication of the one or more parameter values that indicate the structure of the antenna array comprises: receiving one or more of a first parameter value indicating an arrangement of antenna elements within the antenna array, a second parameter value indicating a quantity of antenna elements within the antenna array, a third parameter value indicating a size of the antenna array, or a fourth parameter value indicating one or more distances between antenna elements of the antenna array, wherein transmitting the second indication is based at least in part on the one or more of the first parameter value, the second parameter value, the third parameter value, or the fourth parameter value.

Aspect 24: The method of any of aspects 18 through 23, further comprising: receiving, from the first wireless device, an indication that an activation state of a subset of antenna elements of the plurality of antenna elements is incapable of being modified, wherein transmitting the second indication is based at least in part on receiving the indication that the activation state of the subset of antenna elements is incapable of being modified.

Aspect 25: The method of any of aspects 18 through 24, wherein transmitting the second indication to modify the activation state of the one or more antenna elements comprises: transmitting an indication to modify a LNA metric associated with the one or more antenna elements, a phase shifter metric associated with the one or more antenna elements, a power level metric associated with the one or more antenna elements, or any combination thereof.

Aspect 26: The method of any of aspects 18 through 25, wherein transmitting the second indication to modify the activation state of the one or more antenna elements comprises: transmitting an indication to deactivate the one or more antenna elements.

Aspect 27: The method of any of aspects 18 through 26, further comprising: transmitting, to the first wireless device, an indication of a second activation state for the plurality of antenna elements of the antenna array, the second activation state configured for performing transmissions at the first wireless device; receiving a reference signal from the first wireless device based at least in part on transmitting the indication of the second activation state; and transmitting, to the first wireless device in response to receiving the reference signal, a third indication to modify the second activation state, to use the second activation state to perform transmissions, or both.

Aspect 28: The method of any of aspects 18 through 27, further comprising: receiving, from the first wireless device, a report comprising an indication of signals received by the first wireless device which were transmitted by a third wireless device, wherein transmitting the second indication to modify the activation state of the one or more antenna elements of the plurality of antenna elements of the antenna array is based at least in part on receiving the report.

Aspect 29: An apparatus for wireless communication at a first wireless device, comprising a processor; memory coupled with the processor; and instructions stored in the memory and executable by the processor to cause the apparatus to perform a method of any of aspects 1 through 17.

Aspect 30: An apparatus for wireless communication at a first wireless device, comprising at least one means for performing a method of any of aspects 1 through 17.

Aspect 31: A non-transitory computer-readable medium storing code for wireless communication at a first wireless device, the code comprising instructions executable by a processor to perform a method of any of aspects 1 through 17.

Aspect 32: An apparatus comprising a processor; memory coupled with the processor; and instructions stored in the memory and executable by the processor to cause the apparatus to perform a method of any of aspects 18 through 28.

Aspect 33: An apparatus comprising at least one means for performing a method of any of aspects 18 through 28.

Aspect 34: A non-transitory computer-readable medium storing code the code comprising instructions executable by a processor to perform a method of any of aspects 18 through 28.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first wireless device, comprising:
   transmitting, to a second wireless device, a first indication of a capability to selectively configure activation states for a plurality of antenna elements of an antenna array of the first wireless device, and of one or more parameter values that indicate a structure of the antenna array associated with one or more characteristics of beams formable by the antenna array;
   receiving, from the second wireless device in response to the transmitted first indication, a second indication for the first wireless device to modify an activation state of one or more antenna elements of the plurality of antenna elements;
   identifying the activation state of the one or more antenna elements based at least in part on the received second indication; and
   communicating with the second wireless device using the antenna array according to the identified activation state of the one or more antenna elements.

2. The method of claim 1, further comprising:
   transmitting, to the second wireless device, a request for the second wireless device to configure the activation state of the one or more antenna elements, wherein the second indication is received based at least in part on transmitting the request.

3. The method of claim 2, wherein the request indicates a quantity of antenna elements associated with the request, that the request is associated with the one or more antenna elements, or both.

4. The method of claim 1, wherein transmitting the first indication of the one or more parameter values that indicate the structure of the antenna array comprises:
   transmitting a first parameter value indicating an arrangement of antenna elements within the antenna array, a second parameter value indicating a quantity of antenna elements within the antenna array, or both, wherein receiving the second indication is based at least in part on the first parameter value, the second parameter value, or both.

5. The method of claim 4, wherein the first parameter value indicating the arrangement of antenna elements within the antenna array comprises an indication of a unified linear array, a unified rectangular array, a unified circular array, or any combination thereof.

6. The method of claim 1, wherein transmitting the first indication of the one or more parameter values that indicate the structure of the antenna array comprises:
   transmitting a first parameter value associated with supported phases or amplitudes of one or more phase shifters of the antenna array, a second parameter value indicating a size of the antenna array, a third parameter value indicating one or more distances between antenna elements of the antenna array, or any combination thereof, wherein receiving the second indication is based at least in part on the first parameter value, the second parameter value, the third parameter value, or any combination thereof.

7. The method of claim 1, further comprising:
   transmitting, to the second wireless device, an indication that an activation state of a subset of antenna elements of the plurality of antenna elements is incapable of being modified, wherein receiving the second indication is based at least in part on transmitting the indication that the activation state of the subset of antenna elements is incapable of being modified.

8. The method of claim 1, wherein receiving the second indication to modify the activation state of the one or more antenna elements comprises:
   receiving an indication to modify a low noise amplifier metric associated with the one or more antenna elements, a phase shifter metric associated with the one or more antenna elements, a power level metric associated with the one or more antenna elements, or any combination thereof.

9. The method of claim 1, wherein receiving the second indication to modify the activation state of the one or more antenna elements comprises:
receiving an indication to deactivate the one or more antenna elements.

10. The method of claim 1, wherein the first indication is transmitted via a radio resource control message, a media access control-control element message, an uplink control information message, a channel state information report message, or any combination thereof.

11. The method of claim 1, wherein the second indication is received via a radio resource control message, a media access control-control element message, a downlink control information message, a feedback message responsive to a channel state information report message, or any combination thereof.

12. The method of claim 1, further comprising:
identifying a second activation state for the plurality of antenna elements of the antenna array, the second activation state configured for performing transmissions;
transmitting a reference signal to the second wireless device according to the second activation state; and
receiving, from the second wireless device based at least in part on transmitting the reference signal, a third indication to modify the second activation state, to use the second activation state to perform transmissions, or both.

13. The method of claim 12, further comprising:
transmitting a signal to the second wireless device in accordance with the third indication to modify the second activation state, to use the second activation state to perform transmissions, or both.

14. The method of claim 12, further comprising:
receiving, from the second wireless device, an indication of the second activation state configured for performing transmissions, wherein transmitting the reference signal according to the second activation state is based at least in part on receiving the indication of the second activation state.

15. The method of claim 1, further comprising:
identifying signals transmitted by a third wireless device; and
transmitting, to the second wireless device, a report comprising an indication of the signals transmitted by the third wireless device, wherein receiving the second indication to modify the activation state of the one or more antenna elements of the plurality of antenna elements of the antenna array is based at least in part on transmitting the report.

16. The method of claim 1, wherein the first wireless device comprises a user equipment (UE), a first integrated access and backhaul node, or both, and wherein the second wireless device comprises a base station, a second integrated access and backhaul node, or both.

17. The method of claim 1, wherein the one or more characteristics of beams formable by the antenna array comprises an orientation of primary beams, an orientation of unintended grating lobes, a size or shape of primary beams, a size or shape of unintended lobes, or any combination thereof.

18. A method of wireless communication at a second wireless device, comprising:

receiving, from a first wireless device, a first indication of a capability to selectively configure activation states for a plurality of antenna elements of an antenna array of the first wireless device, and of one or more parameter values that indicate a structure of the antenna array associated with one or more characteristics of beams formable by the antenna array; and
transmitting, to the first wireless device in response to the received first indication, a second indication for the first wireless device to modify an activation state of one or more antenna elements of the plurality of antenna elements of the antenna array.

19. The method of claim 18, further comprising:
determining a position of the first wireless device, a position of a third wireless device, or both, wherein transmitting the second indication is based at least in part on the determined position of the first wireless device, the determined position of the third wireless device, or both.

20. The method of claim 18, further comprising:
determining a first communications configuration for wireless communications at the first wireless device, a second communications configuration for wireless communications at a third wireless device, or both, wherein transmitting the second indication is based at least in part on the determined first communications configuration, the determined second communications configuration, or both.

21. The method of claim 18, further comprising:
communicating with the first wireless device based at least in part on the transmitted second indication to adjust the activation state of the one or more antenna elements.

22. The method of claim 18, further comprising:
receiving, from the first wireless device, a request for the second wireless device to configure the activation state of the one or more antenna elements, wherein the second indication is transmitted based at least in part on receiving the request.

23. The method of claim 18, wherein receiving the first indication of the one or more parameter values that indicate the structure of the antenna array comprises:
receiving one or more of a first parameter value indicating an arrangement of antenna elements within the antenna array, a second parameter value indicating a quantity of antenna elements within the antenna array, a third parameter value indicating a size of the antenna array, or a fourth parameter value indicating one or more distances between antenna elements of the antenna array, wherein transmitting the second indication is based at least in part on the one or more of the first parameter value, the second parameter value, the third parameter value, or the fourth parameter value.

24. The method of claim 18, further comprising:
receiving, from the first wireless device, an indication that an activation state of a subset of antenna elements of the plurality of antenna elements is incapable of being modified, wherein transmitting the second indication is based at least in part on receiving the indication that the activation state of the subset of antenna elements is incapable of being modified.

25. The method of claim 18, wherein transmitting the second indication to modify the activation state of the one or more antenna elements comprises:
transmitting an indication to modify a low noise amplifier metric associated with the one or more antenna elements, a phase shifter metric associated with the one or more antenna elements, a power level metric associated with the one or more antenna elements, or any combination thereof.

26. The method of claim 18, wherein transmitting the second indication to modify the activation state of the one or more antenna elements comprises:
transmitting an indication to deactivate the one or more antenna elements.

27. The method of claim 18, further comprising:
transmitting, to the first wireless device, an indication of a second activation state for the plurality of antenna elements of the antenna array, the second activation state configured for performing transmissions at the first wireless device;
receiving a reference signal from the first wireless device based at least in part on transmitting the indication of the second activation state; and
transmitting, to the first wireless device in response to receiving the reference signal, a third indication to modify the second activation state, to use the second activation state to perform transmissions, or both.

28. The method of claim 18, further comprising:
receiving, from the first wireless device, a report comprising an indication of signals received by the first wireless device which were transmitted by a third wireless device, wherein transmitting the second indication to modify the activation state of the one or more antenna elements of the plurality of antenna elements of the antenna array is based at least in part on receiving the report.

29. An apparatus for wireless communication at a first wireless device, comprising:
a processor,
memory coupled with the processor; and
instructions stored in the memory and executable by the processor to cause the apparatus to:
transmit, to a second wireless device, a first indication of a capability to selectively configure activation states for a plurality of antenna elements of an antenna array of the first wireless device, and of one or more parameter values that indicate a structure of the antenna array associated with one or more characteristics of beams formable by the antenna array;
receive, from the second wireless device in response to the transmitted first indication, a second indication for the first wireless device to modify an activation state of one or more antenna elements of the plurality of antenna elements;
identify the activation state of the one or more antenna elements based at least in part on the received second indication; and
communicate with the second wireless device using the antenna array according to the identified activation state of the one or more antenna elements.

30. An apparatus for wireless communication at a second wireless device, comprising:
a processor, memory coupled with the processor; and
instructions stored in the memory and executable by the processor to cause the apparatus to:
receive, from a first wireless device, a first indication of a capability to selectively configure activation states for a plurality of antenna elements of an antenna array of the first wireless device, and of one or more parameter values that indicate a structure of the antenna array associated with one or more characteristics of beams formable by the antenna array; and
transmit, to the first wireless device in response to the received first indication, a second indication for the first wireless device to modify an activation state of one or more antenna elements of the plurality of antenna elements of the antenna array.

* * * * *